US010892625B1

(12) United States Patent
Franklin et al.

(10) Patent No.: US 10,892,625 B1
(45) Date of Patent: Jan. 12, 2021

(54) CASES AND FOLIOS FOR CARRYING AND CHARGING ACCESSORIES

(71) Applicant: Apple Inc., Cupertino, CA (US)

(72) Inventors: Jeremy C. Franklin, San Francisco, CA (US); Yoonhoo Jo, San Francisco, CA (US); Nicholas R. Trincia, San Francisco, CA (US); Paul M. Baker, Pleasanton, CA (US); Jessica J. Lu, San Francisco, CA (US); Hao Zhu, San Jose, CA (US); Samuel Gilkison Smith, San Francisco, CA (US); Amit S. Barve, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 419 days.

(21) Appl. No.: 15/847,732

(22) Filed: Dec. 19, 2017

Related U.S. Application Data

(60) Provisional application No. 62/460,257, filed on Feb. 17, 2017.

(51) Int. Cl.
| | | |
|---|---|---|
| *H02J 7/00* | (2006.01) | |
| *A45C 15/00* | (2006.01) | |
| *A45C 11/00* | (2006.01) | |
| *A45C 13/02* | (2006.01) | |
| *H02J 7/02* | (2016.01) | |
| *H04B 5/00* | (2006.01) | |

(52) U.S. Cl.
CPC ............ *H02J 7/0042* (2013.01); *A45C 11/00* (2013.01); *A45C 13/02* (2013.01); *A45C 15/00* (2013.01); *H02J 7/00* (2013.01); *H02J 7/025* (2013.01); *A45C 2011/001* (2013.01); *A45C 2011/002* (2013.01); *A45C 2011/003* (2013.01); *A45C 2013/025* (2013.01); *H04B 5/0037* (2013.01)

(58) Field of Classification Search
CPC . H02J 7/00; H02J 7/0042; H02J 7/025; A45C 15/00; A45C 11/00; A45C 13/02; A45C 2011/001; A45C 2011/002; A45C 2011/003
USPC ......................................................... 320/108
See application file for complete search history.

(56) References Cited

U.S. PATENT DOCUMENTS

| | | |
|---|---|---|
| 8,390,255 B1 | 3/2013 | Fathollahi |
| 8,514,042 B2 | 8/2013 | Lauder et al. |
| 8,891,800 B1 * | 11/2014 | Shaffer ................ H04R 1/1025 381/384 |
| 9,225,372 B2 | 12/2015 | Butler |
| 9,275,049 B2 | 3/2016 | Del Toro |

(Continued)

*Primary Examiner* — Nathaniel R Pelton
(74) *Attorney, Agent, or Firm* — Dickinson Wright RLLP

(57) ABSTRACT

This application relates to a case for retaining a portable electronic device and an accessory. The case can include a main body that includes a back panel and sidewalls for retaining a portable electronic device. The case can also include a receptacle coupled to the main body. The receptacle can have a cavity that generally corresponds to the dimension of an accessory for retaining the accessory. The case can further include a first terminal, a second terminal, and a battery. The first terminal can receive electrical energy from the portable electronic device to charge the battery. And the electrical energy stored in the battery can be transferred to the accessory through the second terminal. The case and the portable electronic device may communicate via near-field communication. The case can further include a slotted compartment to store money and credit cards.

13 Claims, 17 Drawing Sheets

(56) References Cited

U.S. PATENT DOCUMENTS

| | | |
|---|---|---|
| 9,288,295 B2 | 3/2016 | Ivanovski et al. |
| 9,331,519 B2 | 5/2016 | Lin et al. |
| 9,419,670 B2 | 8/2016 | Fathollahi |
| 9,473,192 B2 | 10/2016 | Fathollahi et al. |
| 9,874,914 B2 * | 1/2018 | Obie .................... G06F 1/1632 |
| 2013/0129138 A1 | 5/2013 | Washington, Jr. |
| 2013/0148839 A1 | 6/2013 | Stevinson |
| 2013/0265702 A1 * | 10/2013 | Merenda ............... A45C 11/00 361/679.01 |
| 2016/0087469 A1 * | 3/2016 | Armstrong ............ A45C 11/00 320/107 |
| 2016/0134142 A1 * | 5/2016 | Murphy ................. H02J 7/025 455/573 |
| 2017/0026498 A1 * | 1/2017 | Goldfain ................ H02J 7/342 |
| 2017/0126268 A1 * | 5/2017 | Evans, V ............ H04B 1/3883 |
| 2017/0170678 A1 * | 6/2017 | Uhm ....................... H02J 50/70 |
| 2017/0259424 A1 * | 9/2017 | Vetter ................... H02J 7/0044 |
| 2018/0020812 A1 * | 1/2018 | Rao .......................... A45F 3/04 320/137 |

* cited by examiner

CASES AND FOLIOS FOR CARRYING AND CHARGING ACCESSORIES

CROSS-REFERENCE TO RELATED APPLICATIONS

The present application claims the benefit of U.S. Provisional Application No. 62/460,257, entitled "ACCESSORIES FOR PORTABLE ELECTRONIC DEVICES," filed Feb. 17, 2017, which is incorporated herein by reference in its entirety for all purposes.

FIELD

The described embodiments relate generally to protective cases and covers for electronic devices. More particularly, the present embodiments relate to cases and covers that receive and retain portable electronic devices as well as electronic accessories, such as earphones, and that provide or facilitate charging of the electronic accessories or the electronic devices.

BACKGROUND

Recent advances in computing devices have allowed various electronic accessories for portable electronic devices to become increasingly sophisticated and complex. Those accessories add features to the electronic devices and provide convenience for the users. The electronic accessories are typically attached to the portable electronic devices via a port of the electronic device, or are wirelessly coupled with the portable electronic devices. The prevalence of wireless technologies has made wireless accessories more common, thereby eliminating the need for wired connections between accessories and the electronic devices.

SUMMARY

This paper describes various embodiments related to articles for retaining a portable electronic device and an accessory.

According to one embodiment, a case for retaining a portable electronic device is described. The case can include a back cover, a front cover, and a hinge portion that can pivotally couple the front and back covers. The case can also include a retainer carried by the back cover. The retainer can be used to retain the portable electronic device. The case can also include a receptacle that can be attached to its hinge portion. The receptacle can be used to retain an accessory device. The receptacle can include a battery and a charge terminal electrically coupled to the battery such that at least some electrical energy stored in the battery can be transferred to the retained accessory device.

According to another embodiment, a case can include a body that can be used to receive a portable electronic device. The body can include a back panel and sidewalls. The body is arranged to carry a first charge terminal that can be used to receive energy from a circuit external to the body. For example, the circuit external to the body can be a circuit of a portable electronic device. The case also can include a battery and circuitry that electrically couples the first charge terminal to the battery such that at least some energy received at the first charge terminal can be transferred to and stored in the battery. The case can further include a receptacle that is coupled to the body. The receptacle can be used to retain an accessory device. The receptacle can include a second charge terminal. The circuitry can electrically couple the battery to the second charge terminal such that energy stored at the battery can be transferred to the accessory device.

According to yet another embodiment, a method for forming a case is described. The case can have a single-piece cover layer that has a first portion that is capable of pivoting about a second portion along a hinge portion. The method can include positioning circuitry having a first charge terminal on a surface of the cover layer. The method can also include securing a receptacle having a second charge terminal along the hinge portion. The method can further include positioning a battery on the surface of the cover layer. The method can further include electrically coupling the first charge terminal to the battery so that electrical energy received at the first charge terminal can be stored at the battery. The method can further include electrically coupling the battery to the second charge terminal so that electrical energy stored at the battery can be transferred to the second charge terminal. The method can further include covering the circuitry and the battery with a surface layer.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
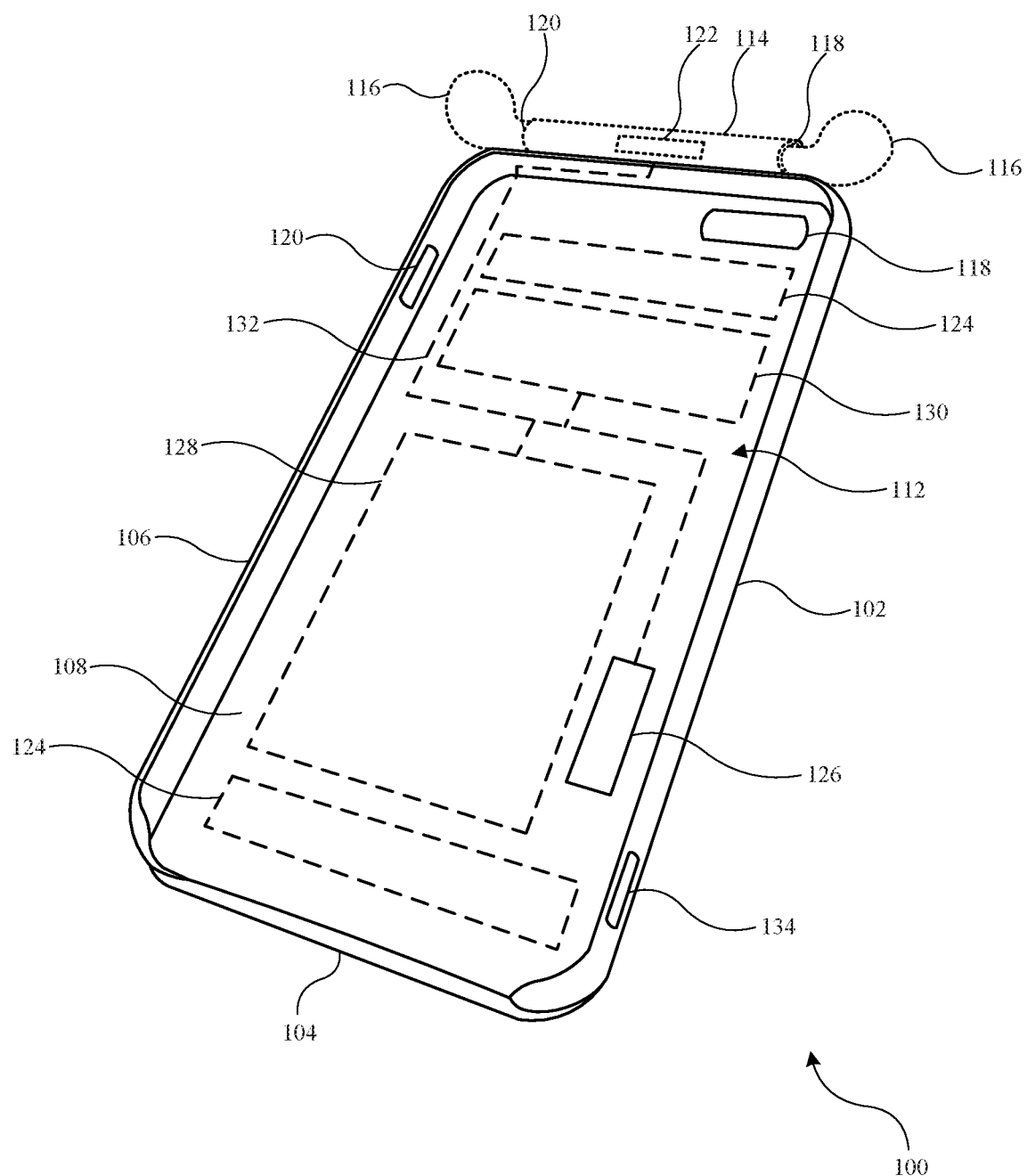
FIG. 1 illustrates a front perspective view of an article in accordance with an embodiment.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Embodiments described herein relate to cases (e.g., covers, folios, wallets etc.) for electronic devices (e.g., mobile phones, tablet computers, etc.) and associated electronic accessories (e.g., earphones, speakers, microphones, watches, cameras, biometric monitors, etc.). The cases can be protective in nature or simply an aesthetically pleasing adornment, or in some embodiments can be both protective and ornamental in nature. The cases can include a cavity for accepting and retaining the electronic device and one or more receptacles for accepting and retaining one or more electronic accessories. The cases can include features that charge or facilitate charging of the electronic accessories or the electronic device. Thus, the cases can integrate the charging and the protection of a portable electronic device and its accessories.

According to some embodiments, the case can include one or more charging sites for providing power to the electronic accessory, the electronic device, or both. The charging sites can be located in a main body used for retaining the electronic device, in the receptacles used for retaining the electronic accessories, or both. In some instances, the charging sites can include a wireless charger that is capable of wirelessly charging the electronic accessory and/or the electronic device. Examples of such wireless chargers include suitable inductive chargers, including those using near-field communication (NFC) protocols and/or those using wireless charging standard such as the Qi standard. In some cases, the charging site includes electrical contacts that contact corresponding electrical contacts of the electronic accessory and/or the electronic device, and transfer charge to and/or from the electronic accessory and/or the electronic device. In some embodiments, the article can include both wireless chargers and direct contact chargers.

In some embodiments, the case can include a battery that stores electrical charge supplied by the electronic device, the electronic accessory, and/or another charge source (e.g., a wall plug). In some instances, the battery can be located in select locations of the article for optimal performance and cosmetic appeal. In some instances, the case can include one or more magnets that facilitate retention of the electronic device and/or the electronic accessory to the article. In some cases, the case can also include a display that displays information supplied by the electronic device and/or the electronic accessory, such as a level of charge of the electronic device and/or the electronic accessory.

The possibility to charge an accessory from a portable electronic device via a case provides a novel integration solution to an accessory that requires specialized chargers. Because of their sizes, shapes and designs, many accessories, such as wireless accessory devices, require their own charging box or charging cradle. Those accessories may not be equipped with wireless charging capacity and require a physical contact with their charging box or cradle. Also, they often cannot be charged by standard charging ports such as Universal Serial Bus (USB). For example, an accessory device is usually too small or too thin to fit a USB port. Because of those reasons and other design reasons, electronic devices often cannot be used to directly charge those electronic accessories. Instead, end users may normally be required to carry a specialized charger if they want to charge an accessory.

The integration of charging and protection in a case also ensures that an accessory can almost always be functional when it is paired with a portable electronic device. Oftentimes end users only find out their electronic accessory is out of power when they use the accessory. But they might not carry a charger with them. This problem is solved by using the case described herein because users can charge their accessory via a case using the power from the electronic device or using the energy stored in the battery of the article. Typically an electronic device can have a significantly larger battery capacity than its accessory. Hence, within predetermined limits, the use of power from the electronic device to charge the accessory does not adversely affect the regular operation of the electronic device.

The cases described herein can be used with any suitable electronic devices and electronic accessories, such as those sold by Apple Inc. of Cupertino, Calif. Examples of suitable electronic devices can include mobile phones, tablet computers, laptop computers, media players, watches, cameras, and other suitable electronic devices. Examples of suitable electronic accessories can include earphones, both wired and wireless, watches, styluses or electronic pencils, keyboards, electronic mice, speakers, cameras, microphones, drones, biometric monitors, card readers, adapters, chargers, cables, and other suitable electronic devices. Examples of cases described herein can include a protective article, a folio, a wallet, a flap, a cover, an enclosure, a holster, a clip, a sleeve, an armband, or suitable combination hereof.

These and other embodiments are discussed below with reference to FIGS. 1-22B; however, those skilled in the art will readily appreciate that the detailed description given herein with respect to these figures is for explanatory purposes only and should not be construed as limiting.

Figure 2:
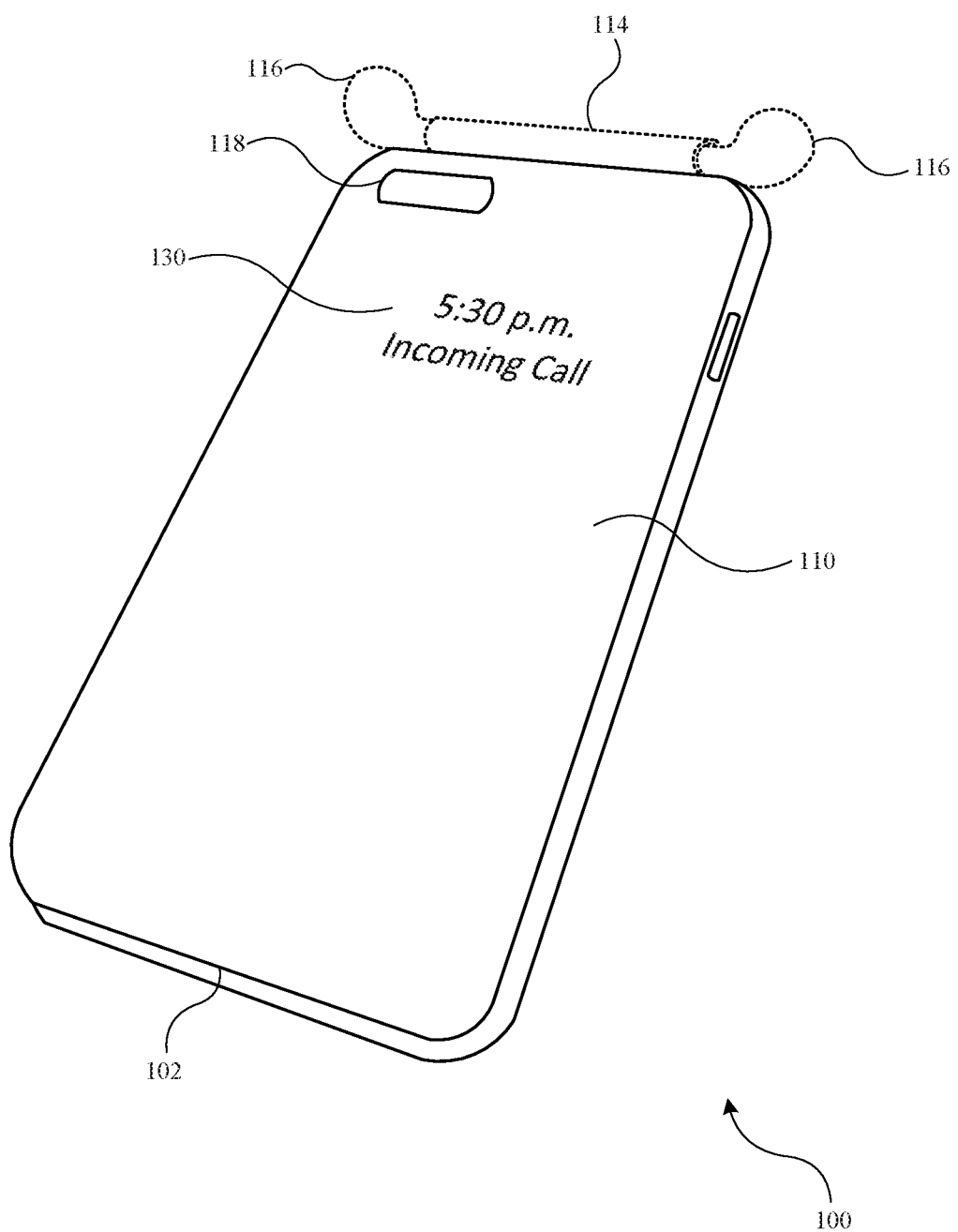
FIG. 2 illustrates a back perspective view of the article shown in FIG. 1.

FIGS. 1-2 show a perspective view of representative case 100 which can also be referred to as article 100 for a portable electronic device and accessories. FIG. 1 shows a perspective front view and FIG. 2 shows a perspective back view of article 100. The article 100 can include a main body 102, which includes a back panel 104 and sidewalls 106. Main body 102 can serve as a retainer that can retain a portable electronic device (not shown in FIG. 1). In some cases, the main body 102, including the back panel 104 and the sidewalls 106, is a single unitary piece. In other cases, the back panel 104 and the sidewalls 106 are separate pieces that are coupled together using stitching, soldering, adhering, or any appropriate ways. Each of the pieces can be made of the same material or different materials. The back panel 104 has an inner surface 108 and an outer surface 110 that generally faces away from the portable electronic device. The sidewalls 106 can be a flange-like structure that surrounds the back panel 104 along its perimeter so that the sidewalls 106 and the back panel 104 define a cavity 112 that generally corresponds in dimension with a portable electronic device (not shown in FIG. 1) so that the article 100 can receive the electronic device.

The main body 102 can be coupled with a receptacle 114 for retaining an accessory. Receptacle 114 can be referred as a retainer, a holder, a container, a housing, a case, a box, a cradle or other suitable term. It can be used to receive and retain accessory 116 and provide or facilitate charging to the accessory 116 in a manner that will be described in detail below. Accessory 116 can be any suitable type of device, such as another electronic device. In some cases, accessory 116 is associated with electronic device. For example, accessory 116 can be earphone that can wirelessly couple with electronic device. The wireless earphones are capable of being inserted into a user's ear opening or coupled directly to a user's ear lobe. Other accessories can include watches, styluses or electronic pencils, keyboards, electronic mice, speakers, cameras, microphones, drones, biometric monitors, card readers, adapters, chargers, cables. It should be noted that for the remainder of this paper, the wireless accessory device takes the form of wireless earphones well suited for use in combination with a portable electronic device. However, it is understood that the accessory 116 is not limited to wireless earphones and can be any other electronic accessory, as described above. In some embodiments, the article 100 is also configured to accept more than one electronic accessory or more than one receptacle.

Article 100 can be composed of any suitable material or materials. Main body 102 and receptacle 114 can be composed of the same material or different materials. In one embodiment, main body 102 can include a rigid material, such as a polycarbonate, fiberglass, or other rigid polymer such that article 100 maintains its general shape. However, the material should be at least partially deformable such that an electronic device can be placed within and removed from main body 102. In some embodiments, main body 102 can be designed to retain the electronic device within cavity 112 at least partially by interference fit (i.e., frictional fit). In some cases, main body 102 can be composed of a more flexible material, such as silicone, other suitable polymer, or leather. In some cases, back panel 104 and sidewalls 106 of main body 102 are composed of the same material or different materials. For example, back panel 104 may be composed of a more rigid material than sidewalls 106, or vise versa. Receptacle 114 can include a housing that can be composed of rigid polymer such as polyvinyl chloride, polycarbonate, high-density polyethylene, or fiberglass. Alternatively or additionally, receptacle 114 can be composed of a more flexible material, such as silicone, rubber, or other suitable polymer materials. It should be understood that any suitable material that is capable receiving a portable electronic device and an accessory may be employed and are not limited to those listed above, including suitable polymeric materials (e.g. polypropylene, polyvinyl chloride, polyurethane), fabrics, metal (e.g., aluminum), wood, synthetic and/or natural leathers, with or without reinforcement or any combination thereof.

Still referring to FIGS. 1 and 2, the article 100 can further include a magnet 124 or multiple magnets 124 that can be used to attract the portable electronic device and/or an additional article that is adapted to attach the article 100 in a manner that will be discussed in further detail below. In some cases, the magnet 124 can be embedded inside the body 102 and is not visible to the users. For example, magnet 124 can be positioned between layers (e.g., a front layer and a back layer) of material, which will be described in detail below with reference to FIG. 10. Magnet 124 can include any suitable type of magnetic material, such as suitable rare-earth (e.g., neodymium-based) and/or iron-based magnetic materials. In some cases, the main surface area of magnet 124 can be much larger than the thickness of magnet 124 in order to provide a maximum effective magnetic surface area for magnetically coupling with portable electronic device.

The article 100 can further include a terminal 126 that is adapted to transfer energy to and/or from electronic device. Terminal 126 can also be referred as a charge terminal, an information terminal, an electrical contact, a transceiver, an antenna, a port, an inlet, a charge station, an inductive charge receiver or transmitter, an NFC charge receiver or transmitter, a communication component or other suitable term as dictated by its particular features and functions. In some cases, terminal 126 transfers the energy wirelessly. For example, terminal 126 can include an inductive charger, such as an NFC charger. In other cases, terminal 126 transfers the energy via electrical contacts that are physically connected to corresponding contacts of electronic device. In some cases, terminal 126 is configured to transfer energy wirelessly and through electrical contacts. If energy is transferred from electronic device, the energy may be stored at battery 128. The stored energy can, in turn, be transferred from battery 128 to a battery of accessory 116. Alternatively or additionally, the energy transferred from electronic device can be directly transferred via electrical wiring within article 100 to accessory 116. In addition to or instead of transferring energy, terminal 126 can be configured to transfer information to and/or from the electronic device. For example, terminal 126 can receive information related to the charge state of a battery of electronic device.

Terminal 126 can be electrically coupled to a display panel 130 on the outer surface 110 of the body 102, to a battery 128 inside the body 102, and to a charging component 122 inside the receptacle 114 via circuitry 132, which can include wires that are internally positioned within article 100 and hidden from a user. Circuitry 132 can also include one or more resistors, inductors, capacitors, switches, processors and/or other electrical components, as dictated by design requirements. Under this configuration, the accessory 116, the electronic device, and the display panel 130 can exchange information and power in a manner that will be described below with reference to FIGS. 22A and 22B that provides detailed structure of circuitries in accordance with some embodiments.

In some case, display panel 130 displays information related to the status of the portable electronic device. For example, in one embodiment, if the electronic device is in an active mode, the display panel 130 will not display any information because the display of information is not necessary when electronic device is in active use. Instead, display panel 130 displays information when electronic device is locked or in an inactive mode. In some embodiments, display panel 130 displays information related to the charge state of the portable electronic device and/or the accessory 116. For example, display panel 130 can display a percentage of charge of a battery of the portable electronic device and/or the accessory 116. In some cases, the display panel 130 displays an alert when the battery/batteries of the portable electronic device and/or the accessory 116 is below a prescribed charged level. In some embodiments, display panel 130 displays time or whether the portable electronic device has an incoming call, as shown in FIG. 2.

In some embodiments, the article 100 may further include an additional power inlet 134. The battery 128 can be charged by an external power source (e.g. a wall plug or a USB power source) via power inlet 134. For example, the power inlet can be located at the body 102. Under such arrangement, the power inlet 134 may also be used to charge the portable electronic device. Also, since the article 100 typically can have a size that is significantly larger than the accessory 116, the battery 128 can also be significantly larger than the battery in the accessory 116 and store sufficient energy to charge the accessory several times. In some cases, the battery 128 may also be used to charge both the accessory 116 and the portable electronic device.

In some instances, the housing for the battery 128 can be opened so that the battery 128 can be replaced. In such cases, the batteries can be disposable batteries such as a series of coin batteries.

Still referring to FIGS. 1 and 2, in some embodiments receptacle 114 is tubular in shape and includes an opening at each end for receiving a pair of accessory devices 116. Receptacle 114 can include two openings 118 and 120, one at each end for receiving accessory devices 116, and a charging terminal 122 in between for energy transfer between the receptacle 114 and the accessory devices 116. The accessory devices 116 can be retained through frictional fit, magnetic coupling, or both. Detailed structure of different embodiments of receptacles will be discussed in detail below with reference to FIGS. 5 and 6.

Receptacle 114 may also have a different shape and a different number of openings for receiving and retaining different types of accessories, as dictated by the size, shape and number of accessories. Since accessory 116 as shown in FIG. 1 is a pair of earphones that include two pieces (one for each ear of a user), receptacle 114 includes two openings 118 and 120 for receiving and retaining both earphones. In other embodiments, a receptacle can be of a box shape similar to receptacle 738 shown in FIG. 10. In yet other embodiments, if the accessory 116 is other type of accessory, the receptacle 114 can take other forms. For example, if the accessory is a stylus, the receptacle 114 may take the form of an elongated housing for receiving the stylus.

In some embodiments, the receptacle 114 is removably attached to the body 102 through any suitable mechanical or magnetic ways. For example, the receptacle 114 can have a magnet embedded generally along its length and magnetically attractable elements (e.g., elements composed of ferromagnetic materials, such as iron based material) can be embedded along the length of the sidewalls 106. Hence, the receptacle 114 can be placed on any side of sidewalls 106 by attaching the magnet to sidewalls 106. In other embodiments, the receptacle 114 can be fixedly attached to the body 102, or be molded with the body 102 as an integrated single piece.

While the receptacle 114 is shown at the topside of the sidewalls 106, it can be at any other locations such as at a lateral side or on the outer surface 110 of the body 102, as indicated by the dashed line of the receptacle 114 in FIG. 1. Those skilled in the art would understand that the size, shape, configuration and location of the receptacle 114 can be driven by the size and shape of the accessory 116 and the desired style of the article 100.

Figure 3:
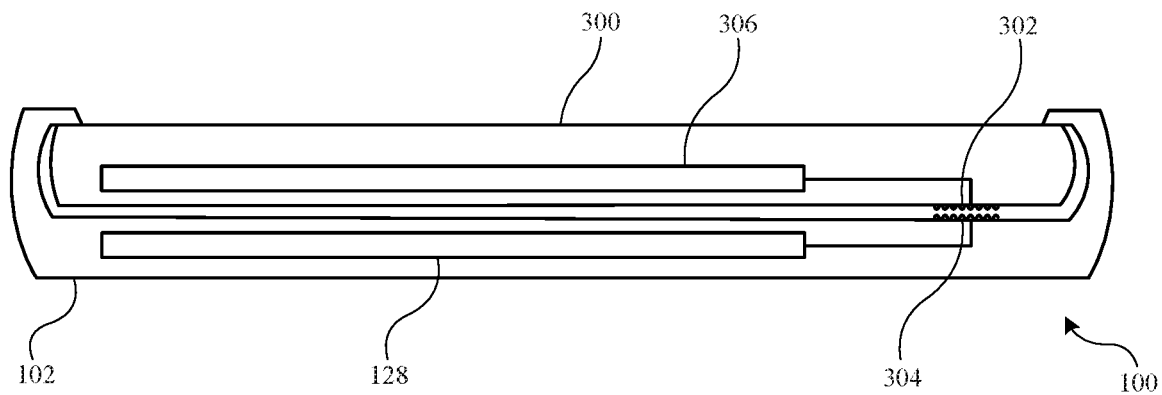
FIG. 3 illustrates a cross-section view of the article shown in FIGS. 1 and 2, illustrating an electrical contact communication between a portable electronic device and the article in accordance with an embodiment.
Figure 4:
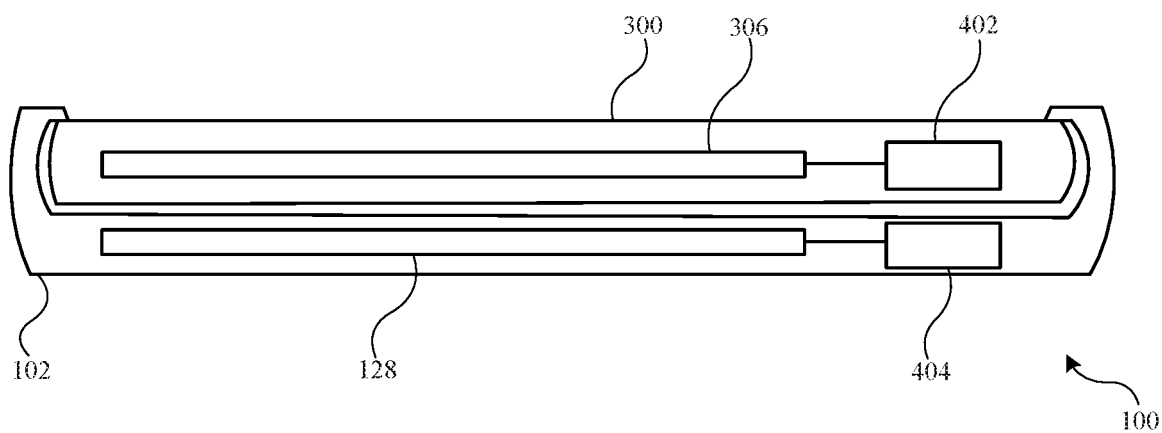
FIG. 4 illustrates a cross-section view of the article shown in FIGS. 1 and 2, illustrating a wireless communication between a portable electronic device and the article in accordance with another embodiment.

FIGS. 3 and 4 shows a cross sectional view of an electronic device 300 retained within article 100 and illustrate features that provide different ways of communication between the article 100 and portable electronic device 300. In an embodiment shown in FIG. 3, the electronic device 300 can include an electrical contact 302 that is adapted to transmit and receive signals and power to and from article 100 by way of electrical contact 304. In one case, the electrical contact 304 shown in FIG. 3 can be one example of terminal 126 shown in FIG. 1. The electrical contact 304 can be connected to internal circuitry carried by article 100. The internal circuitry can be connected to battery 128 and display panel 130. When the electrical contacts 302 and 304 are in contact and the connection between the electronic device 300 and the article 100 is established, electronic device 300 can provide control and information data, such as, charging status, pairing information, time, weather, and incoming calls, for display panel 130. In some cases, article 100 can receive information from electronic device 300. Such information can include, for example, a charging status of accessory 116 that can be indicated using a blinking light that flashes green or red to indicate a charging status of the accessory 116. Besides exchanging information, article 100 can receive energy from electronic device 300 via the electrical contacts 302 and 304 to charge the battery 128. In some embodiments, the power can be transferred in both directions between battery 128 and a battery 306 of the electronic device 300.

Portable electronic device 300 and article 100 can also exchange information and power via wireless short-ranged communication protocols, such as near-field communication (NFC). With reference to FIG. 4, electronic device 300 can include a near-field (NF) transmitter 402 or other suitable wireless transceiver. Article 100 can include a NF receiver 404 that is positioned near the NF transmitter 402 when electronic device 300 is carried by article 100. It should be noted that for NF power transmission, positioning of NF transmitter 402 can be important for establishing a suitable inductive connection. In such arrangement, the terminal 126 shown in FIG. 1 can be internal to the body 102. The NF transmitter 402 and NF receiver 404 can include inductive coils such that electronic device 300 can inductively transfer energy between battery 128 inside the article 100 and battery 306 carried by electronic device 300. The NF transmitter 402 can be adapted to inductively couple with the inductive coil in the NF receiver 404. NF receiver 404 can generate an electric flow in response to the magnetic field that can be used to charge to battery 128, or in some embodiments, battery 306. In some instances, the NFC connection can be calibrated to a very short range between NF transmitter 402 and NF receiver 404, to enhance signal communication and to reduce power loss. Such requirement of close alignment may also avoid interference from other NFC devices and ensure that the NFC connection is only established when the electronic device 300 is retained in the article 100. The establishment of NFC connection may also include an authentication process for security or other reasons. Once the NFC connection is established, electronic device 300 can provide control and information signals for the display panel 130 and to provide energy for the changing of battery 128 through induction or wireless charging ways.

It should be understood that other ways of communication between the portable electronic device 300 and the article 100 are possible. For example, a wired connection, a direct DC connection, Wi-Fi, and/or Bluetooth can also be used. The actual ways and the positions of the terminal 126 of article 100 may be driven by the available communications protocols, the architecture of the electronic device 300, and other design choices.

Figure 5:
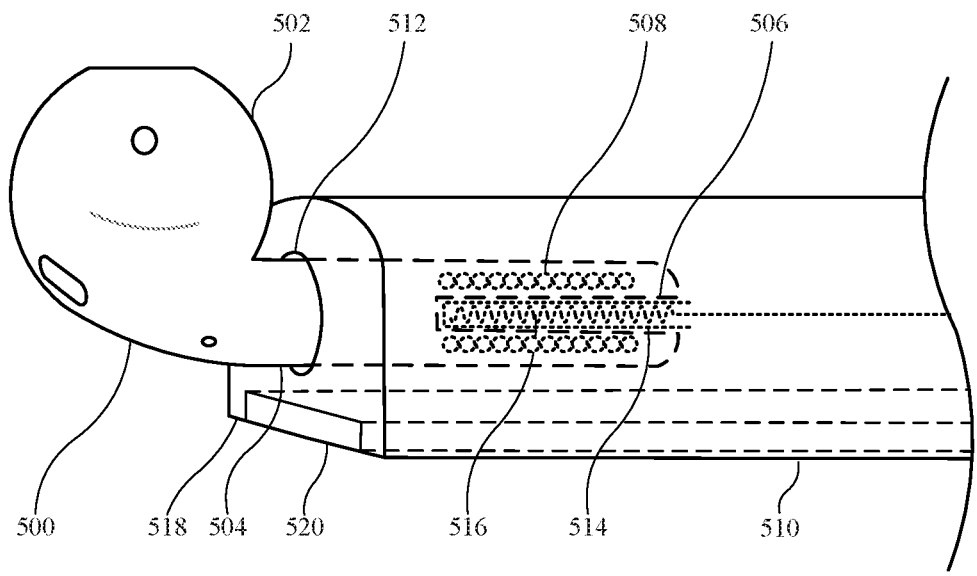
FIG. 5 illustrates a retention mechanism for an accessory with inductive charging features in accordance with an embodiment.
Figure 6:
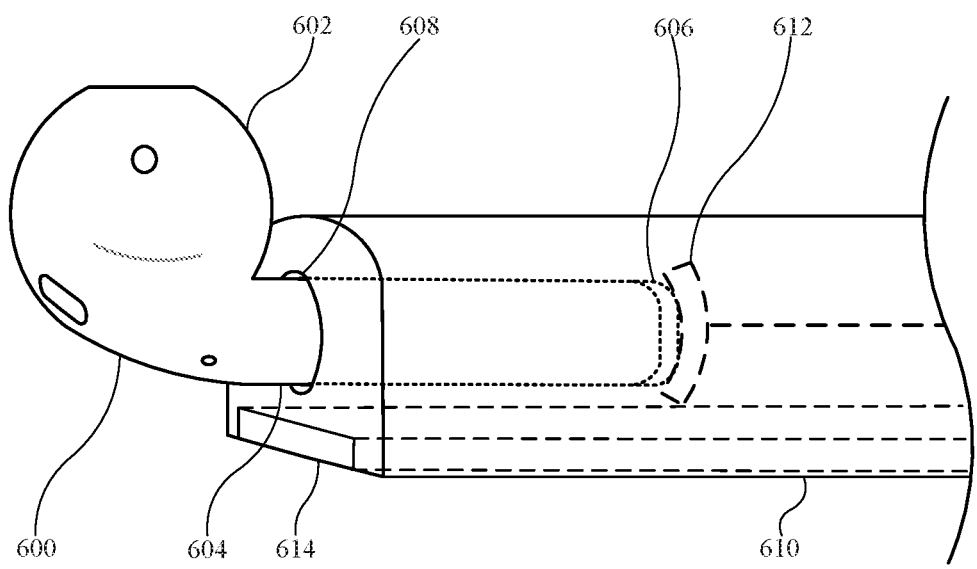
FIG. 6 illustrates a retention mechanism for an accessory with electrical contact features in accordance with another embodiment.

FIGS. 5 and 6 illustrate the retention and charging of an accessory by a receptacle. In FIG. 5, the accessory can be a wireless accessory device 500. The accessory device 500 can include a body portion 502 and a stem portion 504. Stem portion 504 can have a channel 506 that has an opening at its end. An inductive coil 508 that connects to the battery and circuitry (not shown) of accessory device 500 can be present inside stem portion 504. Stem portion 504 can be inserted into a receptacle 510 that has a charge terminal. The charge terminal can include a cavity 512 and a pin 514 that generally conforms to the dimension of channel 506 of accessory device 500. Accessory device 500 can be retained in receptacle 510 through friction between the cavity 512 and the stem portion 504 and between the channel 506 and the pin 514. Inside pin 514, an inductive coil 516 can be connected to a battery source such as battery 128 of article 100 as shown in FIG. 1. As such, accessory device 500 can be charged by receptacle 510 through induction when the accessory device 500 is plugged into the receptacle 510. The receptacle 510 can further include a flat side 518. Generally along the length of the flat side 518, a magnet 520 can be present. The magnet 520 can be used to magnetically attach the sidewalls 106 of an article such as the article 100 shown in FIG. 1. In the case of magnetic coupling, the sidewalls 106 can have magnetically attractive strips embedded therein to allow users to magnetically attach the receptacle 510 at a location chosen by the users along the sidewalls 106. Also, the article 100 may have a metal plate embedded in its back panel so that receptacle 510 can be attached to the back of article 100.

In FIG. 6, an accessory device 600 can include a body portion 602 and a stem portion 604. Stem portion 604 can include a metal contact 606 that is located at the end of the stem portion 604. The metal contact 606 is electrically coupled to the battery and circuitry (not shown) of the accessory device 600. Stem portion 604 can be inserted into a cavity 608 of a receptacle 610, which has a magnet and metal contact 612. Accessory device 600 is retained in the receptacle 610 through friction between cavity 608 and stem portion 604 and also through the magnetic attraction between the magnet and metal contact 612 and the metal contact 606. The magnet and metal contact 612 can be a charging terminal and be connected to a battery source such as the battery 128 of the article 100 as shown in FIG. 1. As such, the accessory device 600 can receive energy and be charged by the receptacle 610 by conduction when the accessory device 600 is plugged into the receptacle 610. The receptacle 610 can further include a magnet 614 along a flat side for magnetically attaching receptacle 610 to an article such as article 100 shown in FIG. 1.

It should be understood that the exact arrangement of how a receptacle retains and charges an accessory may depend on the design and features of the accessory. The features described in FIGS. 5 and 6 are not mutually exclusive. For example, a receptacle may contain both a pin and a magnet to help retain and align the accessory inside the receptacle. Another receptacle may contain a pin and a conduction charger. Also, while two particular arrangements of chargers are shown in FIGS. 5 and 6, it should be understood that a charging arrangement of a receptacle is not limited to those shown in FIGS. 5 and 6 and can include other charging arrangement based on the design and charging configuration of the accessory. Also, the receptacle 510 or 610 can include a specialized charger at the charge terminal so that end users can use the article coupled with a receptacle to charge the accessory using the energy from the electronic device. This eliminates the need for end users to bring an extra charging box or cradle.

FIGS. 7-10 show a representative a case 700. The case 700 can include a folio 702. The folio 702 can include a back cover 704, a front cover 706 hingedly coupled to the back cover 704. The folio 702 can couple to a body 708 that generally corresponds in dimension with an electronic device to retain the electronic device. Body 708 may, in itself, include a back panel and sidewalls that protect the backside, edges and corners of the portable electronic device, similar to body 102 described above with reference to FIGS. 1-4. The body can also be referred as a retainer. The folio 702 may have some recessed areas 710 that allow users to wrap cables around the recessed areas.

Body 708 can be coupled with the folio 702 by different ways. One some cases, body 708 can be removably attached to the back cover 704 through any methods including, but not limited to, clipping, friction, and/or magnets. For example, the body 708 can be the article 100 shown in FIG. 1 that is removably attached to the folio 702 through magnets. In other cases, the body 708 can be fixedly attached to the back cover 704 such as by stitching or adhesion, or be molded with the folio 702 as an integrated single piece.

Figure 7:
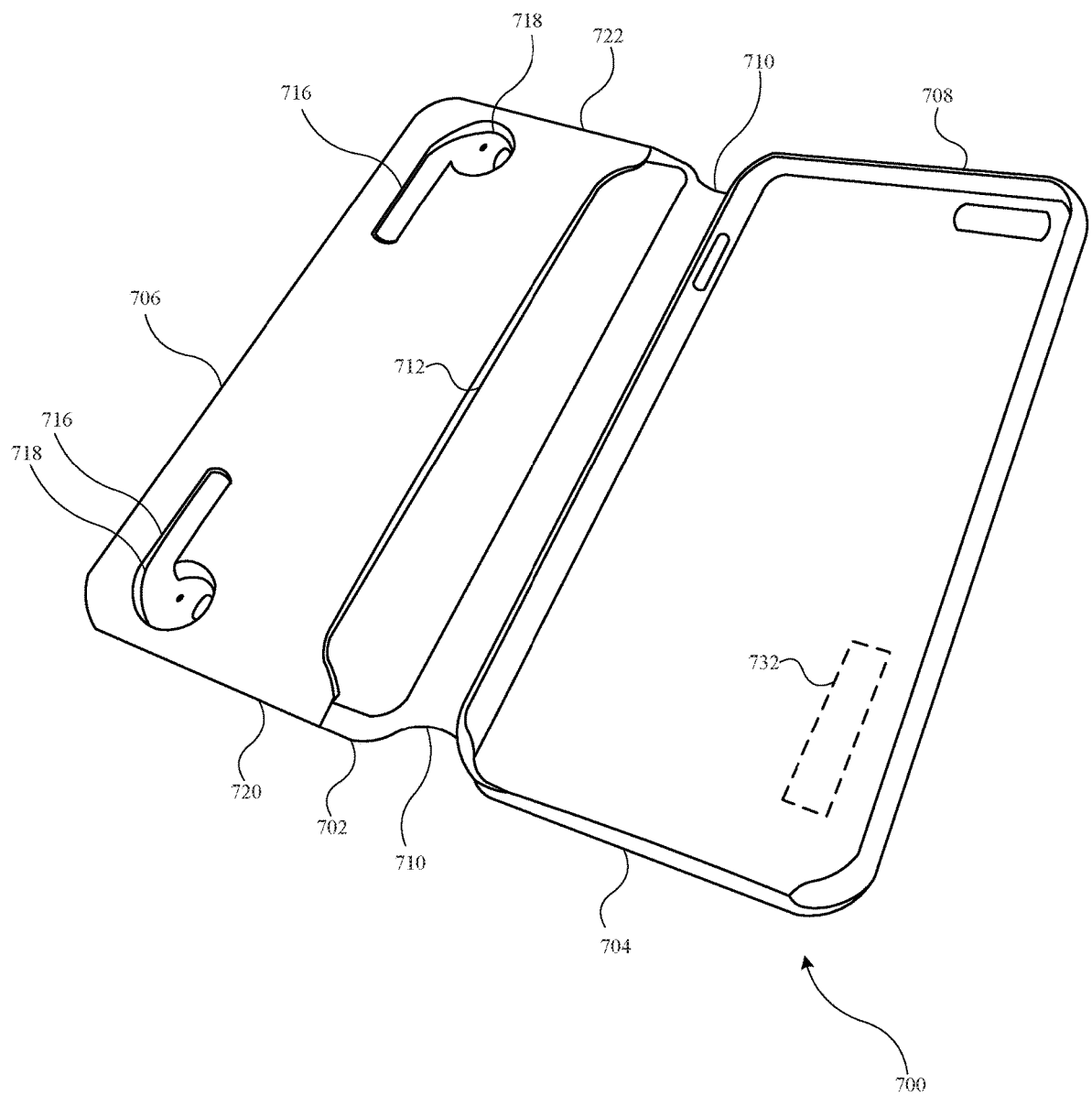
FIG. 7 illustrates a perspective view of a consumer product system having a front cover in accordance with an embodiment.

Front cover 706 can include one or more slotted compartments 712 such as pockets and one or more cavities 716. A slotted compartment 712 can be used to store personal items such as credit cards and money. The folio 702 can further include cavities 716 that can be used to retain and charge accessory 718. In some embodiment, cavities 716 can be part of a retainer such as the receptacle 114 as shown in FIG. 1 or part of a charging box or cradle of an accessory. The exact number, size, shape, configuration, and location of the cavities 716 may depend on the targeted accessories or items to be retained. For example, in the particular embodiment shown in FIG. 7, the accessories can be accessory devices 718. Based on the shape of the accessory devices 718, cavities 716 can have a body portion and a stem portion that generally corresponds the size and the shape of the accessory devices 718. As such, the shape of cavities 716 in accordance with a cross-section shape of the accessory devices provides a frictional fit along sides of accessory devices 718 so that accessory devices 718 can be securely retained. In one case, the portable electronic device can be a smart phone. Because of the relative sizes of the phone and a credit card, the stem portions of the two cavities 716 as shown in FIG. 7 can be displaced apart from each other towards the edges 720 and 722 of the front cover 706. This arrangement provides more spaces for the slotted compartments 712 to fit credit cards. It should be understood that other arrangements and designs are also possible.

Figure 8:
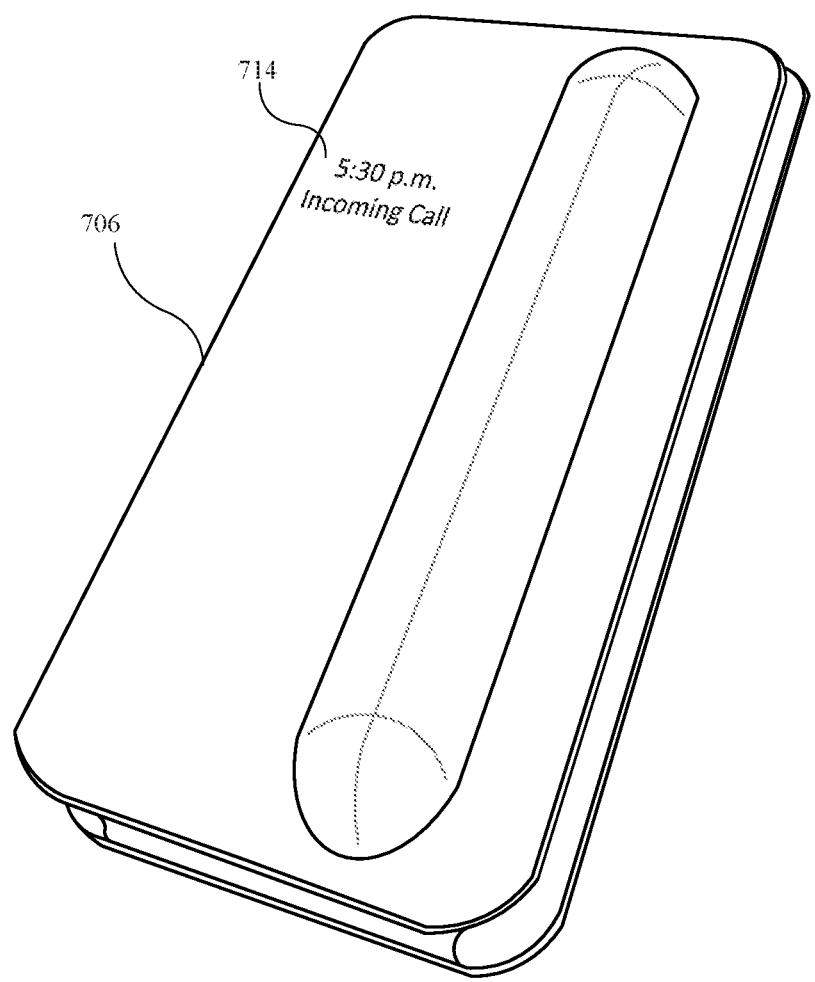
FIG. 8 illustrates a perspective view of the consumer product system shown in FIG. 7 in a folded configuration.
Figure 9:
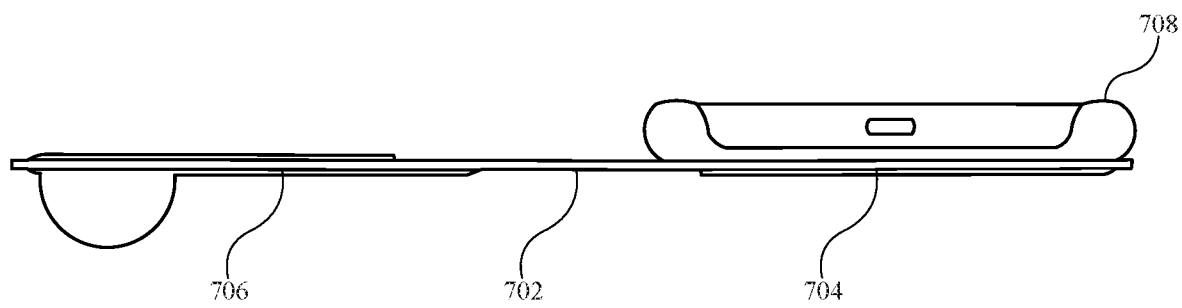
FIG. 9 illustrates a side view of the consumer product system shown in FIGS. 7 and 8.

The case 700 can also include a display panel 714 (shown in FIG. 8) on the flip side of front cover 706 (i.e. the outer surface of the front cover when the folio 702 is closed as shown in FIG. 8). Display panel 714 displays information related to the status of the portable electronic device and other information. For example, display panel 714 can display a percentage of charge of a battery of the portable electronic device and/or the accessory 718. In some cases, the display panel 714 displays an alert when the battery/batteries of the portable electronic device and/or the accessory 718 is below a prescribed charged level. Display panel 714 can also display time or whether the portable electronic device has in incoming call, as shown in FIG. 8. Moreover, in some cases, the display panel 714 can display information based on the position of the front cover 706 of the folio 702. For example, the display panel 714 can display information only when the folio 702 is folded and the front cover 706 covers the electronic device, as shown in the configuration illustrated in FIG. 8. For methods how the electronic device interacts with and detects the position of the front cover 706, U.S. Pat. No. 8,242,868 entitled "Methods and Apparatus for Configuring a Magnetic Attachment System" is hereby incorporated by reference herein in its entirety for all purposes.

Figure 10:
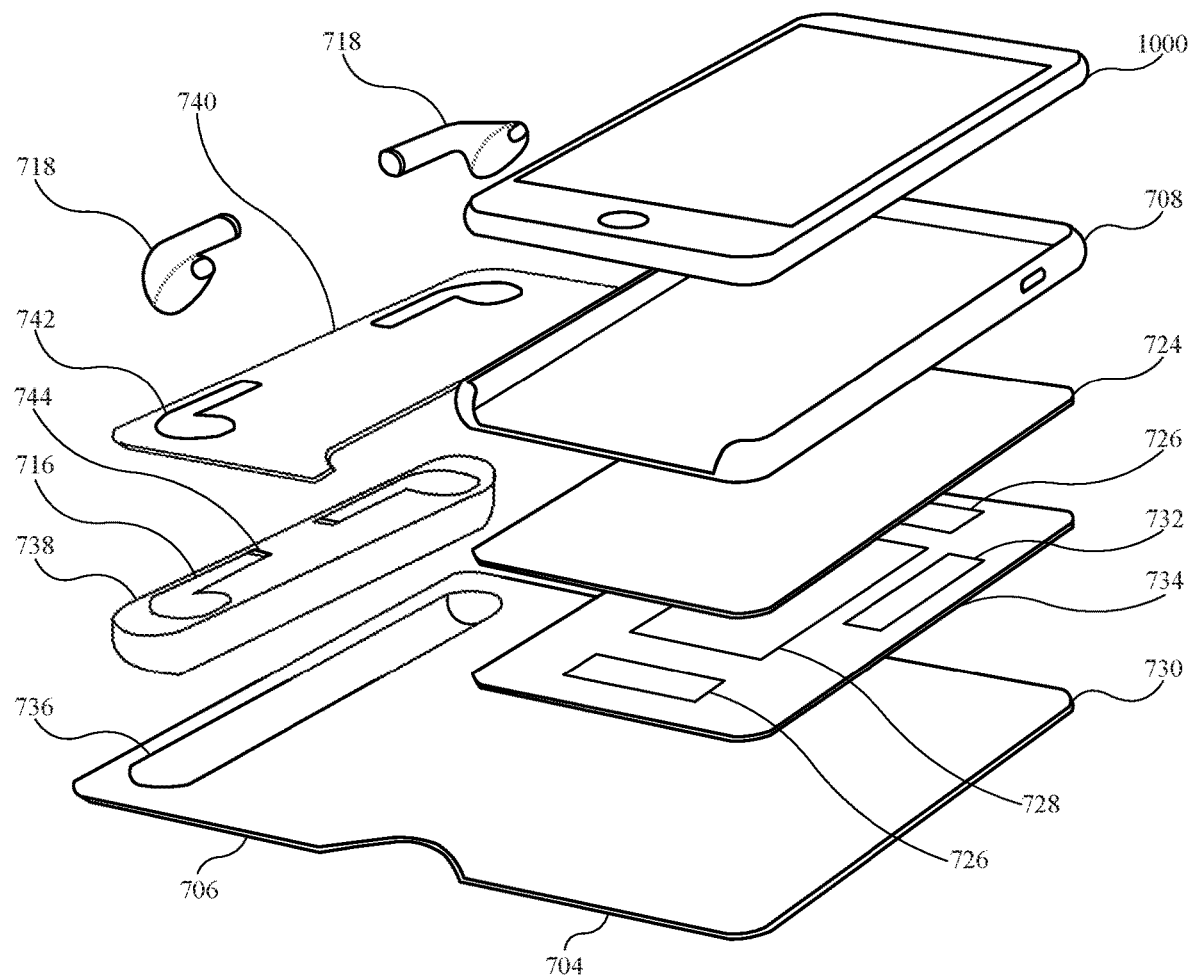
FIG. 10 illustrates an exploded view of the consumer product system of FIGS. 7-9.

FIG. 10 illustrates an exploded view of the consumer product system 700 for portable electronic device 1000 and accessory 718. The system can be a stack of multiple layers. On the back cover 704 side, the system can include the electronic device 1000, a protective body 708, a first surface layer 724, a magnet 726, a battery 728 and the main cover layer 730. A terminal 732 adapted to exchange information and power with the electronic device 1000 can be present at the protective body 708 or at other appropriate locations such as in between the surface layer 724 and the main cover layer 730. One or more magnets 726 can be disposed within the surface layer 724 and the main cover layer 730, which can be stitched to each other to wrap the magnets 726. As shown, magnet 726, battery 728 and terminal 732 can be sandwiched between layers of folio 702 such that they are not visible to a user even when portable electronic device 1000 is decoupled from folio 702. In particular embodiments, magnet 726, battery 728 and terminal 732 are positioned between first surface layer 724 and main cover layer 730, as shown in FIG. 10. The number of layers, however, can vary depending on design requirements. For example, first surface layer 724 may be missing in some embodiments, while more than two layers of material are used in other embodiments. Also, in one instance, magnet 726, battery 728 and terminal 732 can be retained in matrix materials that form a layer 734. In other instances, the matrix layer 734 is not presented and magnet 726, battery 728 and terminal 732 are housed between the surface layer 724 and the main cover layer 730.

On the front cover 706 side, the layers can include the main cover layer 730 having a pocket 736 to receive a receptacle 738 and a second surface layer 740. The surface layer 740 can be stitched to the main cover layer 730 on three of the four sides to form one or more slotted compartments 712. Receptacle 738 can include one or more cavities 716 to removably retain accessory 718. Surface layer 740 can include one or more cutouts 742 that are generally corresponding in shape with cavities 716 so that cavities 716 are accessible to the end users. The receptacle 738 is electrically coupled to battery 728, which in turn is electrically coupled to the terminal 732. The battery 728 may be located in any inner layer such as in between first surface layer 724 and main cover layer 730 at the back cover side 704 or in between second surface layer 740 and main cover layer 730 at the front cover side 702. While the receptacle 738 may not be similar in shape to the receptacle 510 or 610, it can be adapted to communicate with and charge the accessory 718 in the same or similar manner as described FIGS. 5 and 6. In some embodiments, a magnet 744 can be positioned at the stem portion of each cavity to further retain the accessory devices 718. In addition, a charge terminal can also be positioned at the magnet 744. The magnetic coupling can ensure the stem of the accessory devices 718 is in contact with the charge terminal so that the charging of the accessory devices 718 can be maintained when the accessory devices 718 are retained in the cavities 716.

The folio 702 can be composed of any suitable material or materials. The layers can also be composed of fabrics, polymer, natural or synthetic leather, plastic, or any material that is suitable for protecting the portable electronic device 1000. The body 708 can be composed of similar or different materials of the folio 702 based on design and style choices. The layers shown in FIG. 10 can be stitched or adhered together by any suitable methods.

Figure 11:
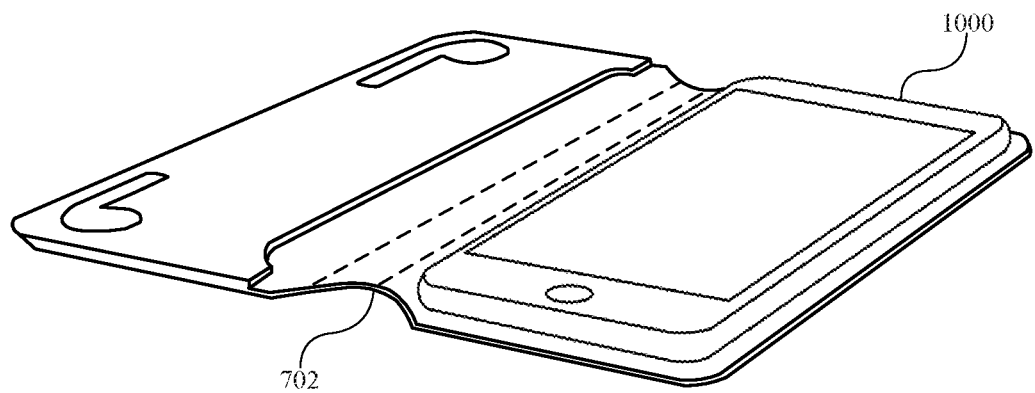
FIG. 11 illustrates a perspective view of a consumer product system that includes features for directly securing a portable electronic device in accordance with an embodiment.

FIGS. 11-14 illustrate different arrangements of articles in accordance with several embodiments. In FIG. 11, the portable electronic device 1000 can be directly and removably connected to the folio 702 via one or more magnets 726 within or on the folio 702 and/or one or more magnets (not shown) within or on the body of the electronic device 1000. For example, the folio 702 can include one or more magnets configured to magnetically couple with one or more magnets or magnetically attractable elements (e.g., elements composed of ferromagnetic materials, such as iron) of the portable electronic device 1000. Alternatively or additionally, folio 702 can include one or more magnetically attractable elements (e.g., elements composed of ferromagnetic materials, such as iron) that are configured to magnetically couple with one or more magnets of the portable electronic device 1000. In this way, folio 702 may not include a body having sidewalls that provide a frictional fit with portable electronic device 1000, such as certain embodiments of body 102 described above with reference to FIGS. 1-10. Instead, portable electronic device 1000 can rely on magnetic attraction between magnets or magnetically attractable elements to removably couple portable electronic device 1000 with folio 702. The back cover can further include a terminal so that the electronic device 1000 can be used to charge and communicate with the accessory.

Figure 12:
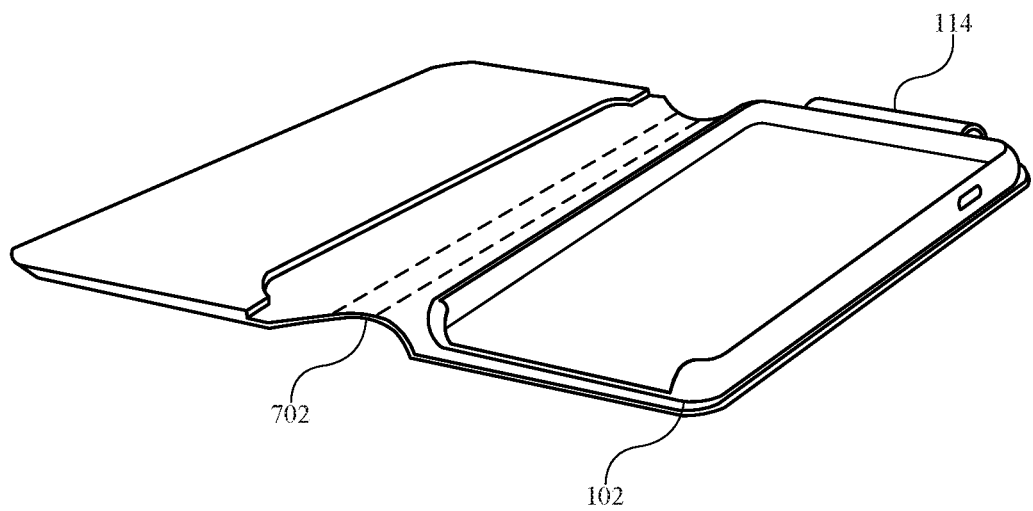
FIG. 12 illustrates a perspective view of a consumer product system that includes features for attaching a receptacle on a sidewall of a main body of the article in accordance with another embodiment.

FIG. 12 shows an arrangement that an article coupled with the receptacle 114. Receptacle 114 can be removably attached to the article. The case 100 can also be removably attached to the folio 702. The receptacle 114, the case 100, and the folio 702 can all include magnets so that they can magnetically coupled to each other. Under this configuration, end users may select to carry different devices and articles. They can sometimes only carry the portable electronic device with the case 100. They can sometimes carry the case 100 with the receptacle 114. And they can further carry the folio 702 enclosing the case 100. This allows flexibility for the end users to carry different things depending on their needs.

Figure 13:
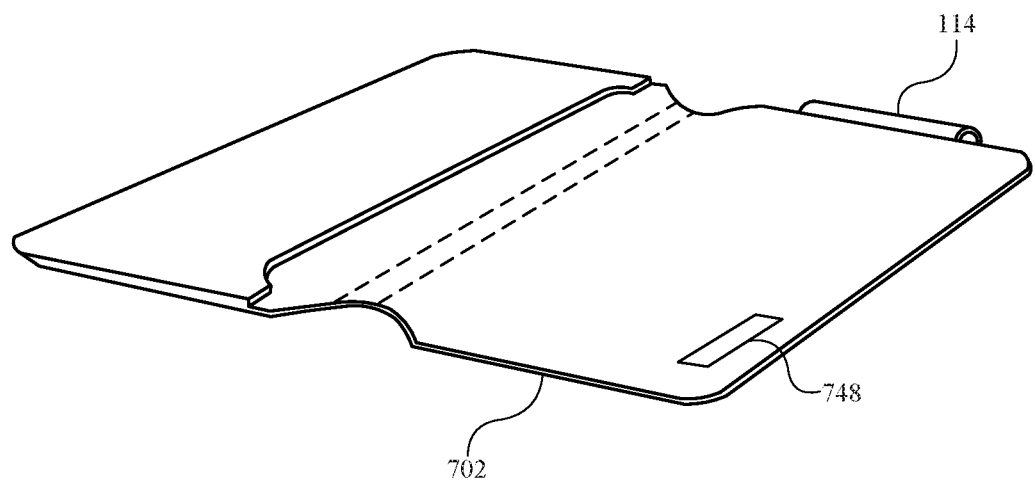
FIG. 13 illustrates a perspective view of a consumer product system that includes features for attaching a receptacle directly on a folio in accordance with yet another embodiment.

FIG. 13 shows receptacle 114 that is directly connected to a folio. And the portable electronic device can also be directly and removably connected to folio 702 via magnetic coupling. The back cover of the folio can further include a terminal 748 so that an electronic device can be used to charged and communicate with the accessory. As the receptacle 114 is positioned on the side of the folio, the thickness of the folio can be reduced. In some instances, since the receptacle 114 can be placed quite close to the electronic device, the receptacle 114 can include short-range communication component such as a NF receiver so that the electronic device can directly communicate with the receptacle 114 and directly provide energy to the accessory without having a battery on the folio. As such, the thickness of the folio can be further reduced.

Figure 14:
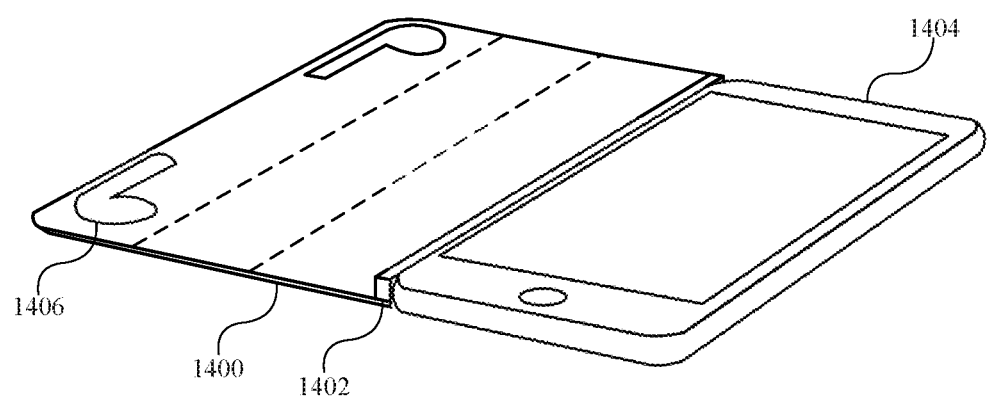
FIG. 14 illustrates a perspective view of a consumer product system that includes features for magnetically attaching a flap to the side of a portable electronic device in accordance with yet another embodiment.

FIG. 14 shows a flap 1400 having a spine 1402 that can be magnetically attached to a portable electronic device 1404. A terminal can be located in the spine 1402 to communicate with and draw power from the electronic device 1404. Flap 1400 can include cavities 1406 to retain an accessory and an internal battery (not shown) to charge the accessory. In some cases, the portable electronic device 1404 can be configured to interact with the flap 1400. For example, the portable electronic device 1404 can detect the position of the flap 1400. When the flap 1400 is turned to cover the monitor of the portable electronic device 1404, the portable electronic device 1404 can be automatically turned off or turned to an inactive state. In some cases, the flap 1400 can be folded into different shapes to form a triangular support structure to support the portable electronic device 1404.

Figure 16:
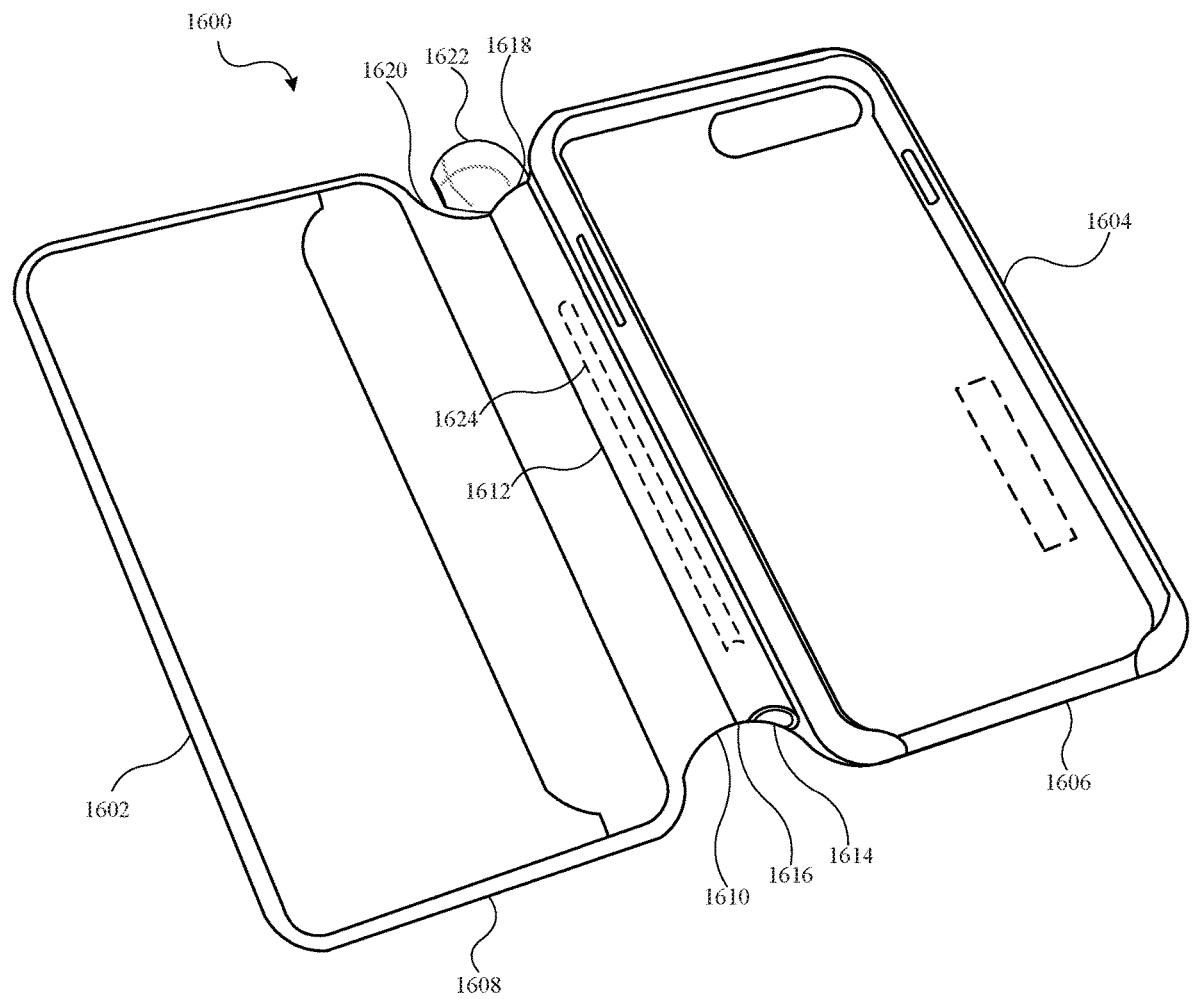
FIG. 16 illustrates a perspective view of a consumer product system that includes features for having a receptacle along the spine of a folio in accordance with another embodiment.
Figure 17:
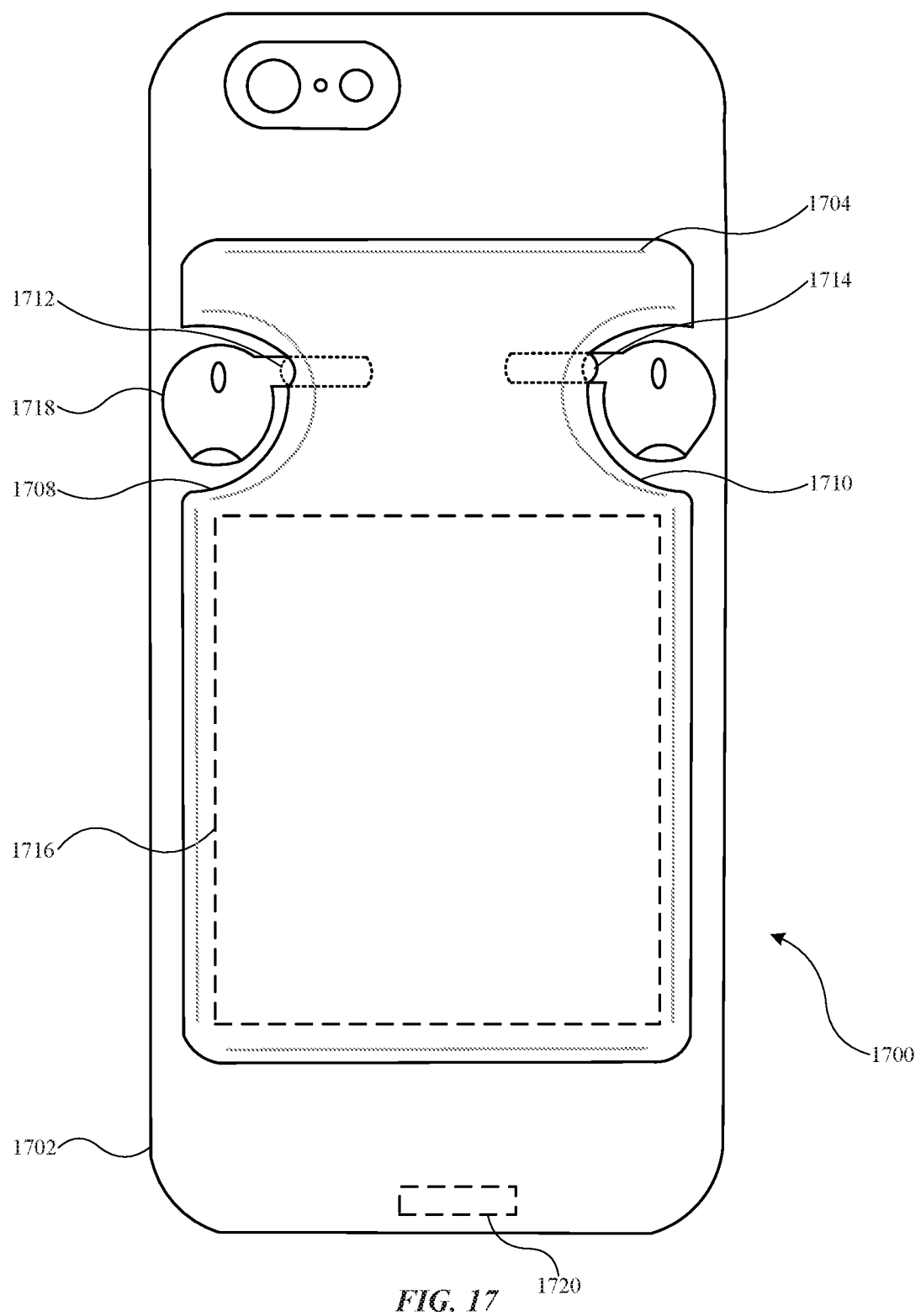
FIG. 17 illustrates a top view of an article that includes features for having a raised back area for housing a battery and an accessory in accordance with another embodiment.

Some of the electronic accessories have unique geometrical shapes that can be difficult to fit with an article without affecting the design of the article. For example, a wireless earphone may include a body portion and a stem. The body portion can be spherical in shape and has a diameter that is larger than the thickness of a portable electronic device. In order to accommodate the shape and size of the accessory device, the article may have to be made thicker than the smart phone, creating a challenge in terms of the aesthetics of the article. FIGS. 15-17 illustrate different embodiments that are designed to accommodate the special shapes of the certain accessories and that include further features that could be included in any of the embodiments.

Figure 15A:
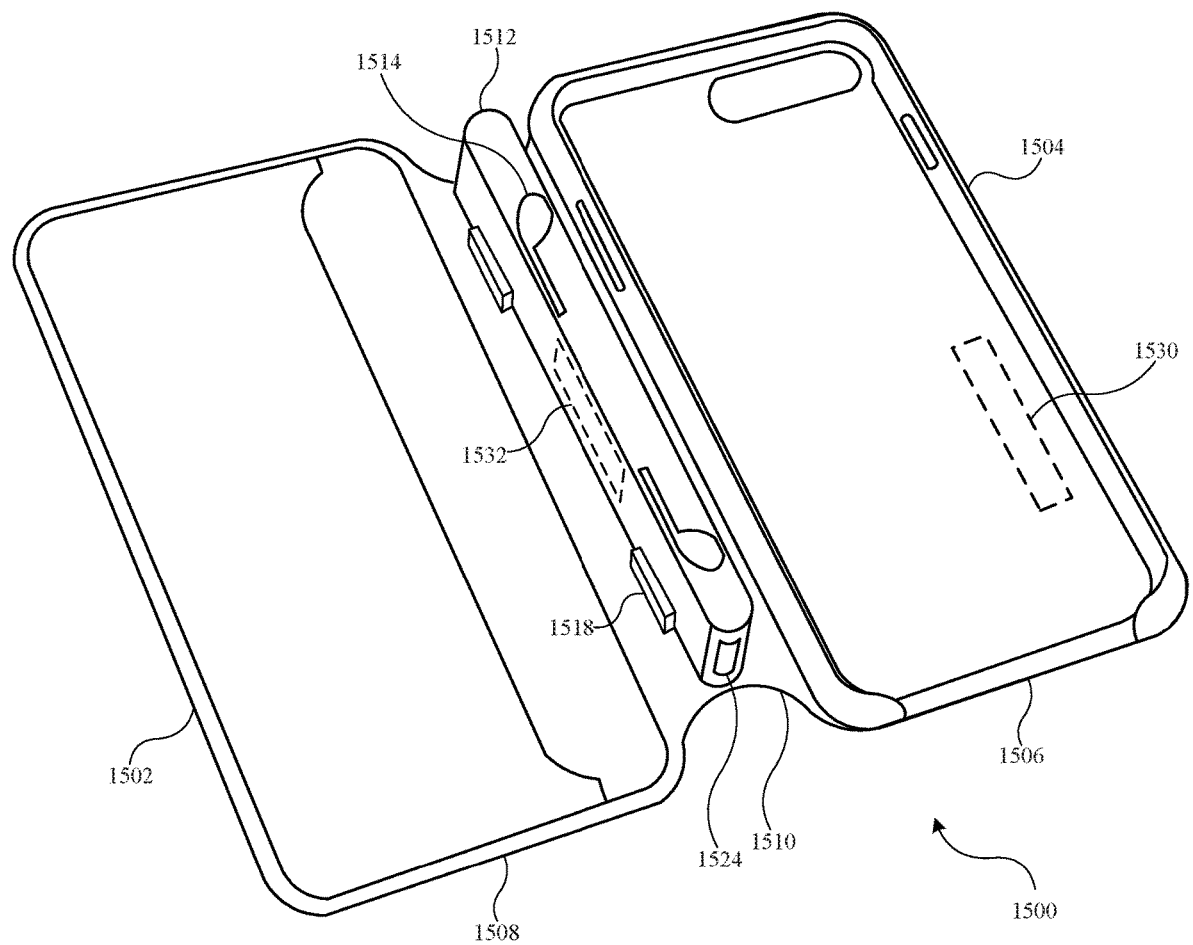
FIG. 15A illustrates a perspective view of a consumer product system that includes features for attaching a charging box at the spine region of a folio in accordance with another embodiment.
Figure 15B:
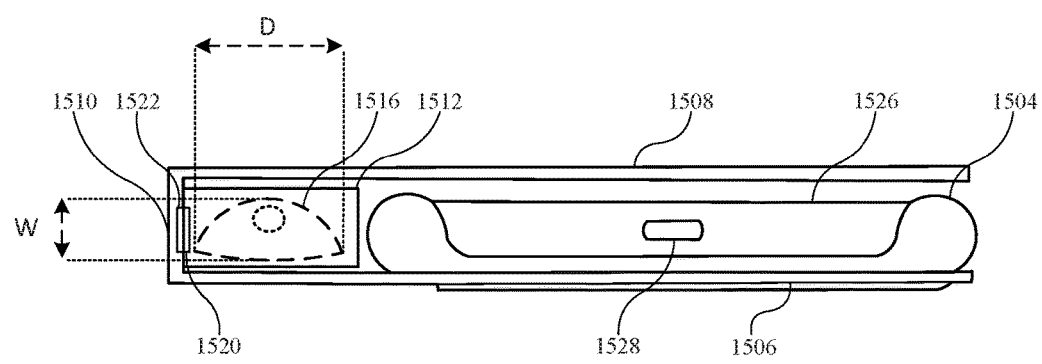
FIG. 15B illustrates a side view of the consumer product system shown in FIG. 15A.

With reference to FIGS. 15A and 15B, a case 1500 can include a folio 1502 coupled with a body 1504. The folio 1502 can include a back cover 1506 and a front cover 1508 that can be pivotally coupled to the back cover 1506 via a middle hinge portion 1510. A receptacle, which can also be referred to as a charging box 1512, can be removably attached to, fixedly attached to, or molded with the folio 1502. The charging box 1512 can include one or more cavities 1514 that are adapted to receive and retain the accessory 1516. In some embodiments, charging box 1512 can be removed from the folio 1502. In such case, the middle hinge portion 1510 may further include one or more ribs 1518. The charging box 1512 can be retained in the folio 1502 through the ribs 1518 and/or through magnetic attraction between the magnet 1520 on the bottom surface of the charging box 1512 and the magnet 1522 on the middle hinge portion 1510.

As shown in FIG. 15B, when the folio 1502 is folded, the central hinge portion 1510 can carry the charging box 1512 to turn sideway. In such arrangement, the width of the charging box 1512 becomes the height of the central hinge portion 1510 and can affect the height of the folded folio 1502 on the hinge side. To minimize the height of the folio 1502 so that the folio 1502 can become more aesthetically pleasing, the width of the charging box 1512 can be minimized. In some embodiments, the accessory 1516 is a pair of accessory devices that have a sideway dimension W smaller than the diameter D of the body portion of the accessory devices. Hence, to minimize the width of the charging box 1512, the cavities 1514 can have a shape that generally correspond to the side cross-sectional shape of the accessory devices 1516 so that the accessory devices can be inserted sideway, as shown in FIG. 15A.

The charging box 1512 can further include a charging inlet 1524 that allows the charging box 1512 to be changed by an external power source (not shown in the figures). The charging inlet 1524 can be any suitable inlet including, but not limited to, a customized charging inlet, a direct DC plug-in, an inductive-coil type plug-in charging port, and a standard charging port such as a USB-C connection port. In some embodiments, the charging inlet 1524 can be the same as the charging inlet 1528 of the portable electronic device 1526. For example, both inlets can be a lightning port made by Apple Inc. of Cupertino, Calif. The charging inlet 1524 can be electrically coupled to a battery 1532 embedded inside the charging box 1512 so that the accessory 1516 can be charged directly by an external power source. In such arrangement, the battery 1532 can be charged by two different ways. First, when an external power source is not connected to the charging box 1512, battery 1532 can be charged by the portable electronic device through terminal 1530. Second, when an external power source is connected, it can be charged by the external power source. In some embodiments, the battery 1532 charged by an external source can store sufficient energy to charge the electronic device 1526 via the terminal 1530. Furthermore, when an external power source is connected to the charging box 1512, the case 1500 can charge both the accessories 1580 and the electronic device 1526 simultaneously. In some situations, the battery 1532 can be bypassed and the accessory 1516 can be charged directly by the electronic device 1526. Such configuration ensures that the accessory 1516 can almost always be operable when the electronic device 1526 is operable.

Now referring to FIG. 16, a case 1600 can include a folio 1602 coupled with a body 1604. The folio 1602 can include a front cover 1608, a back cover 1606, and a middle hinge portion 1610. The middle hinge portion 1610 can be recessed from the front cover 1608 and the back cover 1606. A spine 1612 can be present along the length of the middle hinge portion 1610 between a first recessed area 1616 and a second recessed area 1620. The front cover 1608 can pivotally rotate about the spine 1612 to fold the folio 1602. The spine 1612 can include a first opening 1614 at the first recessed area 1616, a second opening 1618 at the second recessed area 1620, and a battery 1624 embedded therein. The first and second openings 1614 and 1618 can correspond to the size and dimension of the stem of an accessory device 1622 so that the first and second openings 1614 and 1618 can receive, retain, and align a pair of accessory devices 1622. Inside the spine 1612, there can be magnets and/or pins served to further retain and align the accessory devices 1622. When the accessory devices 1622 are inserted into the spine 1612, the accessory devices 1622 can be generally positioned at the recessed areas 1616 and 1620 so that the round shaped accessory devices 1622 do not significant affect the shape and dimension of the folio 1602. Thus, an aesthetically pleasing folio 1602 can be provided. While accessory devices are illustrated with the embodiment shown in FIG. 16, it is understood that the spine 1612 can be of different designs to retain and charge other accessories such as an electronic stylus of a tablet.

A battery 1624 can generally present along the entire length of the spine 1612 except at the locations where the stems of the accessory devices 1622 are received. Since the accessory devices 1622 are inserted at the opposing ends of the spine 1612, the size of the battery 1624 can be maximized. In some embodiments, the battery 1624 can have a capacity large enough that can fully charge the accessory devices 1622 multiple times. It can also have sufficient capacity to charge a portable electronic device retained in the body 1604. In some embodiments, the battery 1624 can be charged by an external source. For example, a direct DC plug-in can be inserted into the first opening 1614 or the second opening 1618 to charge it. Alternatively, the battery can be charged using a separate charging inlet (not shown in the figure) for an external power source. Also in some embodiments, the spine 1612 can be opened and the battery 1624 can be a disposable battery such as an AAA sized battery or a series of coin batteries.

FIG. 17 illustrates a case 1700 in accordance with another embodiment. On its backside 1702, the protective case 1700 can include a raised area 1704 in which a battery 1716 can be embedded therein. The raised area 1704 can include two recessed areas 1708 and 1710 and two openings 1712 and 1714 in the recessed areas. The openings 1712 and 1714 are adapted to removably receive and retain a pair of accessory devices 1718. When the accessory devices 1718 are inserted, they are located at the recessed areas 1708 and 1710. While the openings are shown at each side of the raised area 1704, it is understood that the opening can be positioned at any other locations.

The raised area 1704 can be large enough to accommodate a large capacity battery 1716 that not only can refill the accessory devices 1718, but also can serve as a back up battery for the portable electronic device that is retained by the protective case 1700. The battery 1716 can be charged by an external power source using a power inlet 1720. While the accessory devices 1718 are normally charged by the battery 1716, in some situations the battery 1716 can be bypassed and the accessory devices 1718 can be charged by the electronic device. In one embodiment, the battery 1716 can be the main battery of the electronic device. The electronic device can have a battery that can be smaller than the optimal size. The electronic device can be removed from the case 1700 for relatively short use and be placed back to the case 1700 for extended duration of use. As such, the size of the electronic device can be substantially reduced.

Figure 18:
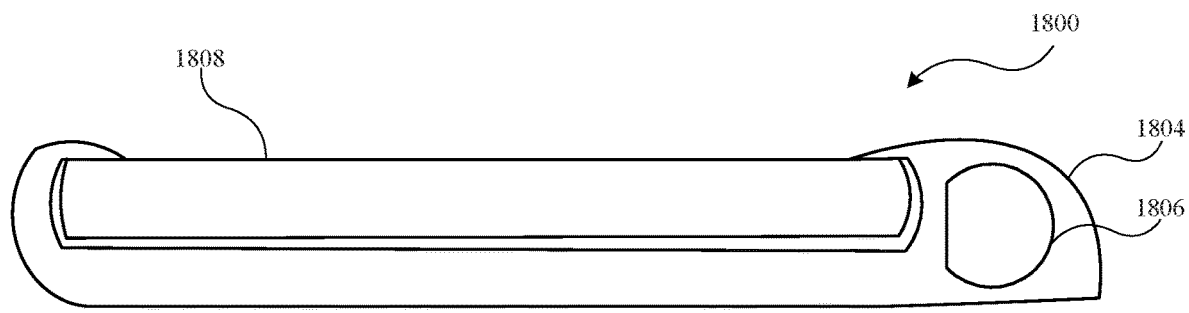
FIG. 18 illustrates a side view of an article that includes features for storing an accessory in a side pocket in accordance with another embodiment.
Figure 19:
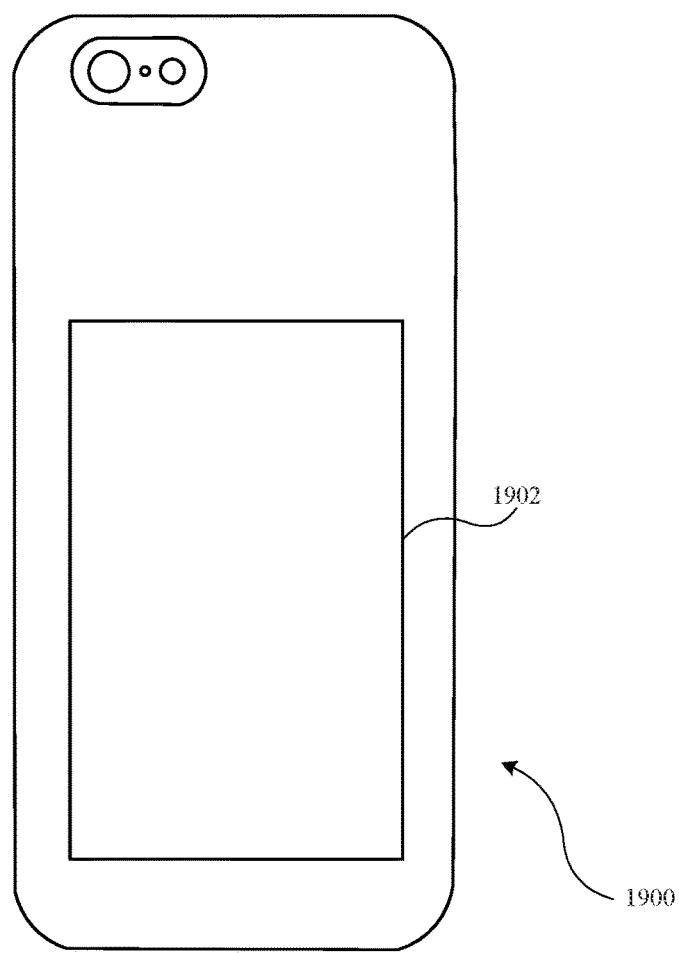
FIG. 19 illustrates a top view of an article that includes features for storing an accessory in a back pocket in accordance with another embodiment.

FIG. 18 illustrates a protective case 1800 in accordance with yet another embodiment. The protective case 1800 can include flexible and stretchable material such as stretch bands on one or both sides 1804 of the case. The accessory 1806 can be placed and retained in between the portable electronic device 1808 and the stretchable side 1804. FIG. 19 illustrative another protective case 1900 in accordance with yet another embodiment. A section 1902 of the back of the protective case 1900 can be composed of stretchable material so that a pocket is formed. Accessories can be retained in the pocket in between the protective case 1900 and the mobile device.

Figure 20:
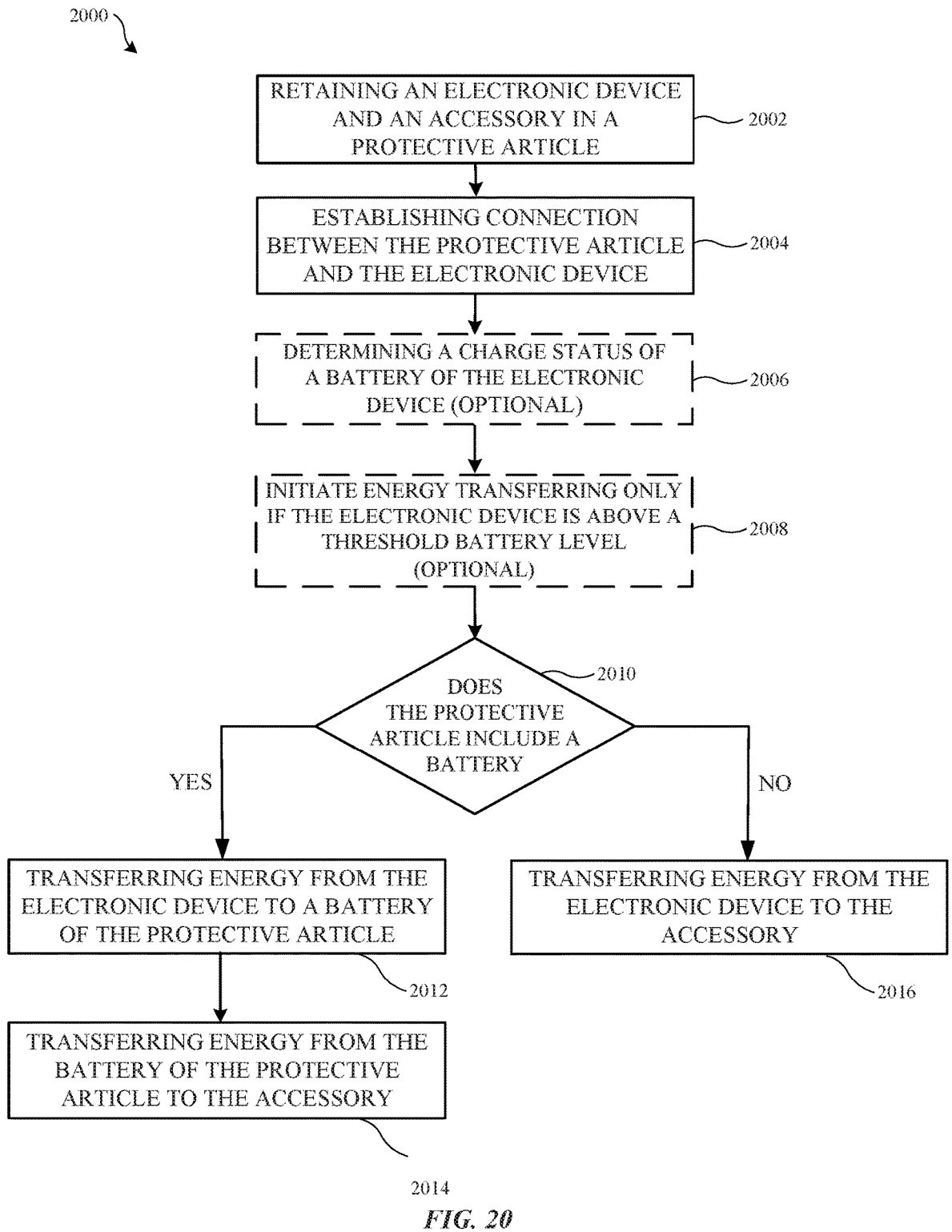
FIG. 20 is a flowchart depicting a method for integrating the charging and the protection of accessories and a portable electronic device using an article system in accordance with an embodiment.

FIG. 20 illustrates a flowchart 2000 depicting a method for integrating the charging and the protection of accessories and a portable electronic device using an article. The method can include step 2002 in which an accessory and a portable electronic device are placed and retained in an article so that they are electrically connected. The method can also include step 2004 of establishing a connection between the article and the electronic device. The establishment of connection may include an authentication process to ensure the communication between the electronic device and the article is authorized. Once the connection is established, the electronic device can control the article and can transmit control and information data, such as charging status, time, weather, and incoming calls, for a display panel of the article. For example, when the accessory and the electronic device are connected to the article, the display panel can display the battery level of the accessory and the electronic device. The display panel of the article can also provide status information indicating whether the accessory is paired with the electronic device.

Normally, typical accessories have smaller batteries compared to the battery of the portable electronic device. Hence, the charging of the accessory usually accounts for a rather insignificant fraction of the electronic device's battery. In some embodiments, the article will begin to draw energy from the electronic device once the connection between them is established. However, in other embodiments, the method can further include optional step 2006 of determining whether the battery of the electronic device is at a low status. For example, if the charging of the accessories' batteries accounts for about 5% of the capacity of the electronic device's battery and the electronic device's battery is at 10%, the system determines that the electronic device's battery is at a prescribed low status so the transfer of energy from the electronic device to the article is blocked. On the other hand, in some embodiments where the electronic device is a mobile phone, when the battery level of the mobile phone is at a critically low status (e.g. lower than 1%) that prevents the mobile phone from making even an emergency call, the system may direct energy to transfer in a reversed direction from the accessory to the mobile phone to enable the mobile phone to have sufficient energy for emergency calls. When the battery of the electronic device is not determined below a prescribed low status at step 2008, the transferring of energy from the electronic device to the article or to the accessory will begin at step 2012 or 2016.

The method can be alternatively implemented depending on whether the article includes a battery. If the article includes a battery, the electronic device can transfer energy to the battery at step 2012. Then the energy can be transferred from the battery of the article to the accessory at step 2014. Alternatively, if the article does not include a battery, the electronic device can transfer energy to the accessory directly at step 2016.

Figure 21:
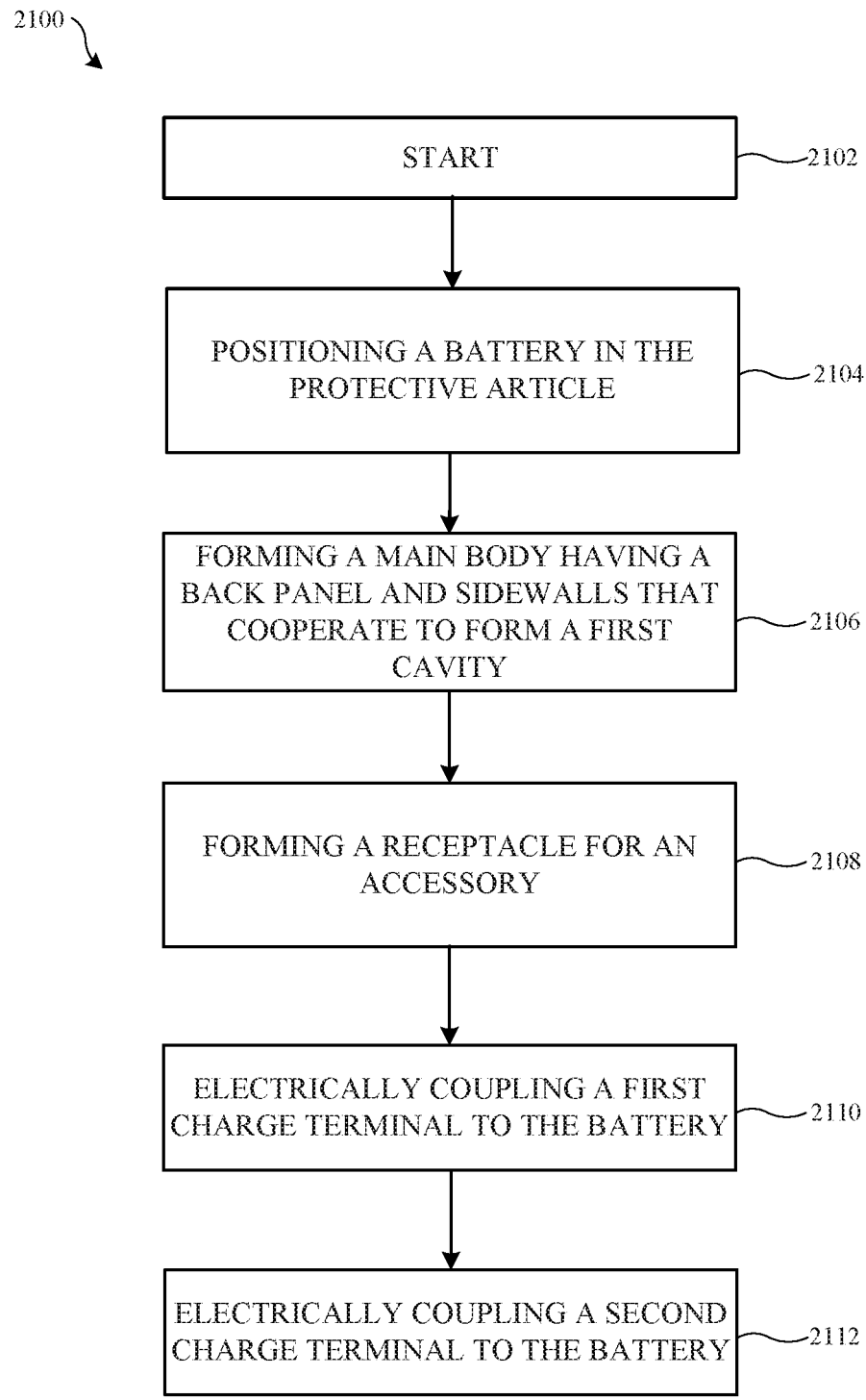
FIG. 21 is a flowchart depicting a method for forming an article system in accordance with an embodiment.

FIG. 21 is a flow chart of an illustrative process for assembling an article. Process 2100 can begin at step 2102. At step 2104, electronic components can be installed in the article. For example, a battery and internal circuitry can be positioned in the article at step 2104. At step 2106, a main body having a back panel and sidewalls can be formed. The back panel and sidewalls can cooperate to form a first cavity. And a first charge terminal adapted to receive energy from the first portable electronic device can be positioned within the back panel. The formation of the housing can be achieved by different methods including molding a suitable material, such as a polymeric material, into the required shape or snitching and adhering different components and layers into the shape of a housing. At step 2108, a receptacle for an accessory can be formed. The receptacle can have a second charge terminal adapted to transfer energy to the second portable electronic device. In some instances, the internal circuitry can include a near-field receiver that is adapted to communicate with a near-field transmitter in the portable electronic device. In additional, a display panel may also be installed on a window of the housing on a surface. At step 2110, the first charge terminal can be electrically coupled to the battery such that energy received at the first charge terminal can be stored at the battery. At step 2112, the second charge terminal can be electrically coupled to the battery such that energy stored at the battery can be transferred to the second charge terminal.

Figure 22A:
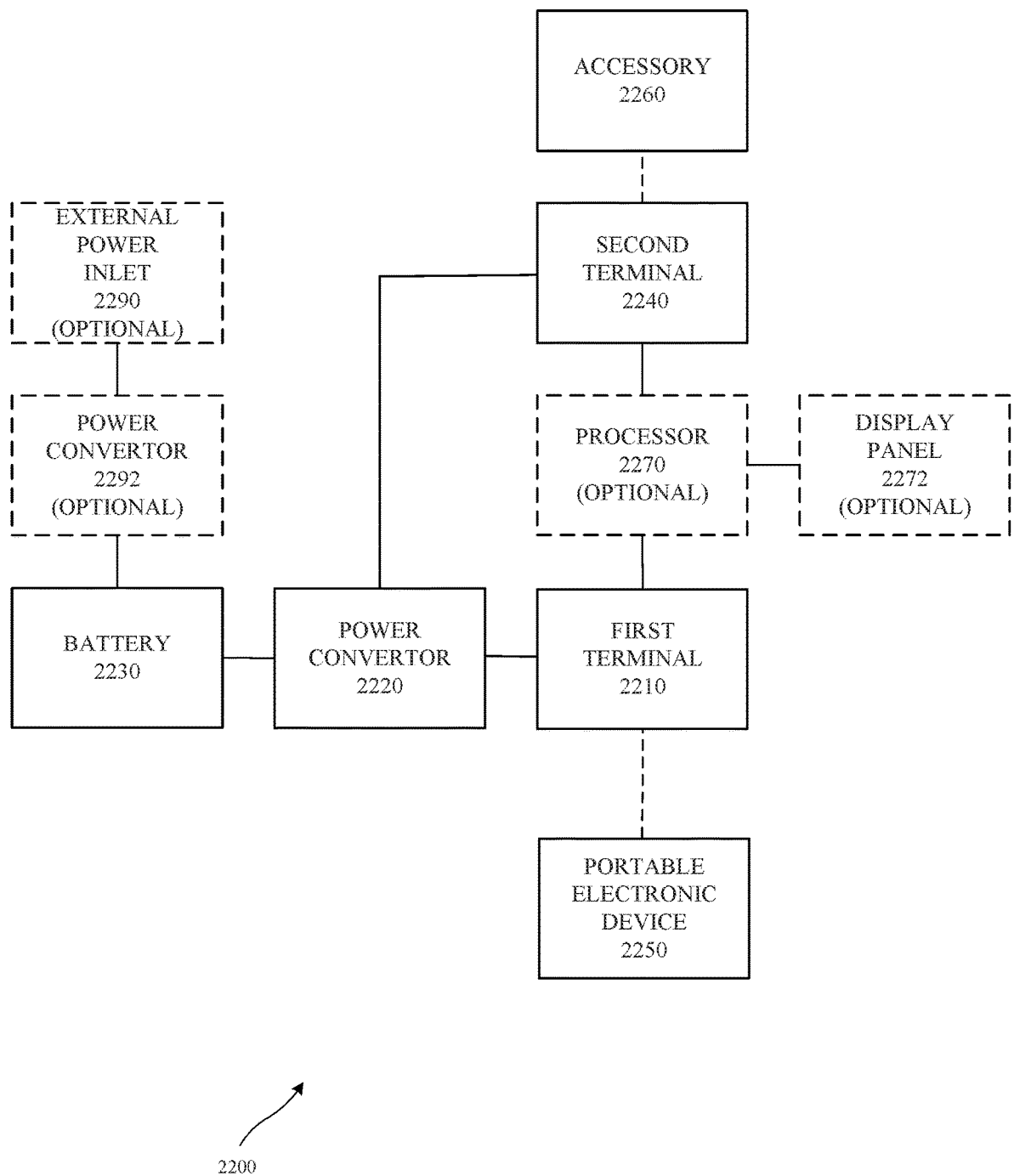
FIGS. 22A and 22B are block diagrams illustrating internal circuitry of articles in accordance with some embodiments.
Figure 22B:
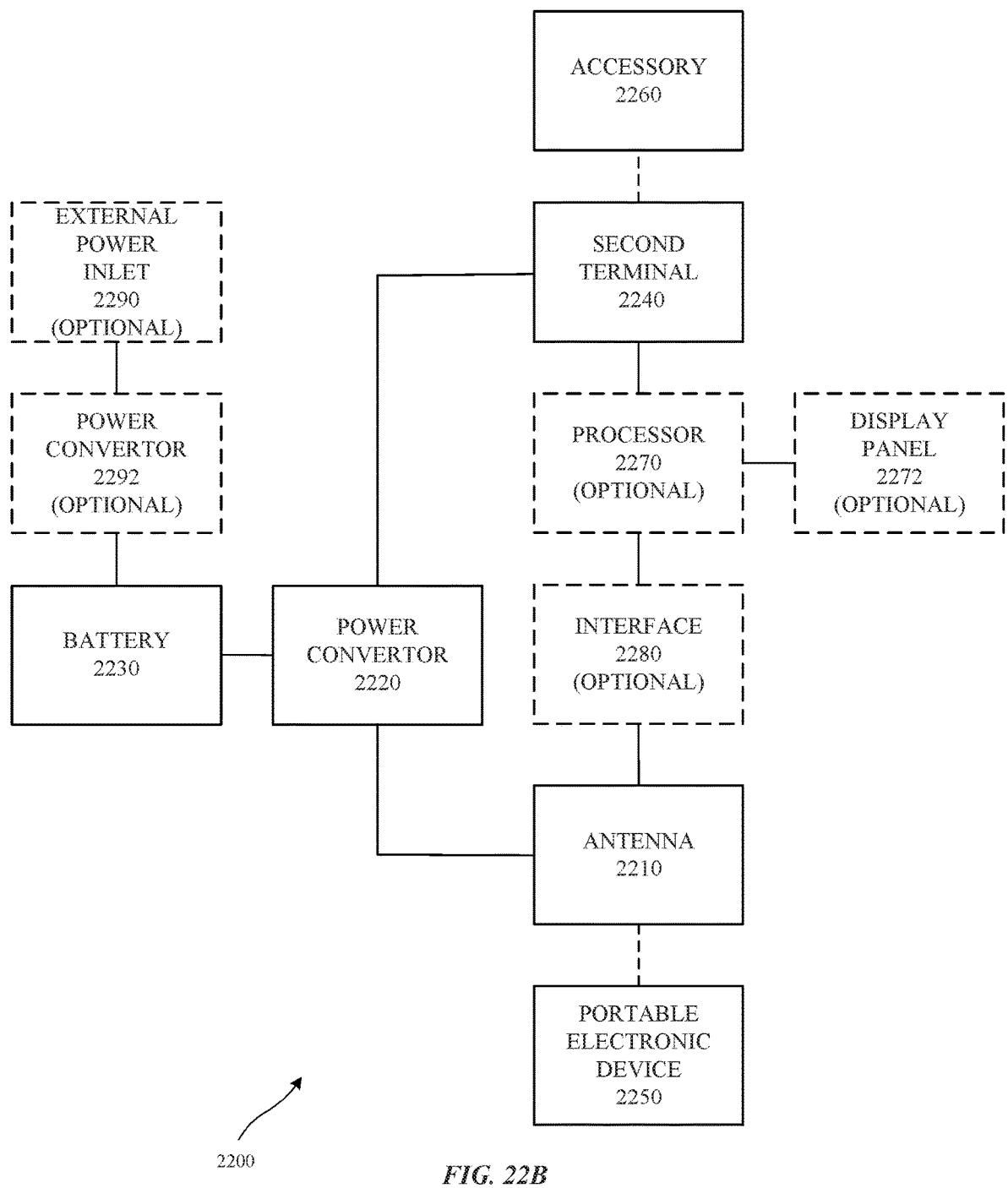

FIGS. 22A and 22B are block diagrams illustrating internal circuitry 2200 of articles in accordance with some embodiments. In one case with the reference to FIG. 22A, the circuitry 2200 in its simplest form comprises a first terminal 2210, a power convertor 2220, a battery 2230 and a second terminal 2240. Power convertor 2220 can be a DC-DC convertor. The first terminal 2210 and the second terminal 2240 can be charge terminals that utilize conduction such as a direct physical plug in or a charge terminal that utilizes induction such as a coil. The components are electrically coupled via circuitry 2200. In this configuration, when a portable electronic device 2250 has established a connection with the first terminal 2210, it completes the circuit with respect to battery 2230, power convertor 2220 and first terminal 2210. As such, the portable electronic device 2250 automatically delivers energy to battery 2230 to store energy in the battery. Alternatively, the first terminal 2210 can be an antenna, such as a NF antenna, as shown in FIG. 22B. An power convertor 2220, such as an energy harvesting circuit, can receive energy from the antenna 2210 and transfer energy to store in battery 2230. Likewise, when an accessory 2260 has established a connection with the second terminal 2240, it completes the circuit with respect to battery 2230 and second terminal 2240. As such, the accessory 2260 automatically receive energy from battery 2230.

In some embodiments, circuitry 2200 can optionally include a processor 2270, as indicated by the dash lines. Processor 2270 can be a dedicated controller, a microprocessor coupled with a memory, or a microcontroller. It is connected to other components of circuitry 2200 to control the components and regulate the communications among the components, and sometimes, the portable electronic device 2250 and the accessory 2260. In some cases, the terminals such as first terminal 2210 can be a type of terminal that allows both transfer of power and information. For example, it can be a port that communicates under protocols such as USB, USB-C, or lightning port. Or it can be an antenna circuit such as a NF transceiver, as shown in FIG. 22B. Under these configurations, when a portable electronic device 2250 is connected to first terminal 2210, power can be transmitted from portable electronic device 2250 to power convertor 2220 while information signals can be transferred to processor 2270 directly or via an interface 2280 for processing. For example, the information signals can be status information from the portable electronic device 2250, such as the status of an incoming call that can be displayed by display panel 2272. Also, the information signals can be the battery level of portable electronic device 2250. Based on the battery level of portable electronic device 2250, the processor 2270 can control first terminal 2210 to decide whether energy should be drawn from portable electronic device 2250. Sometimes the information can also come from accessory 2260 to processor 2270 via second terminal 2240. For example, charge status of accessory 2260 can be transferred to processor 2270 for display panel 2272 to display.

In some embodiments, the circuitry 2200 can also optionally include an external power inlet 2290. The external power inlet 2290 provides energy to the battery 2230 and the rest of the system in circuitry 2200. It draws power from an external source such as a direct DC plug. Hence, a power converter 2292 can be present to regulate, such as step down, the voltage level coming from the external power inlet 2290. In some cases, if a processor 2270 is present, it can direct energy stored in battery 2230 to charge portable electronic device 2250 when an external power source is present. While circuitry 2200 are presented in two forms in FIGS. 22A and 22B, it is understood that the components and configurations shown in FIGS. 22A and 22B can be interchanged, depending on the design of circuitry 2200.

The various aspects, embodiments, implementations or features of the described embodiments can be used separately or in any combination. Software, hardware or a combination of hardware and software can implement various aspects of the described embodiments. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A case for retaining a portable electronic device, the case comprising:
    a back cover;
    a front cover;
    a retainer carried by the back cover, the retainer adapted to retain the portable electronic device;
    a hinge portion that pivotally couples the front cover to the back cover;
    a receptacle integrated with the hinge portion, the receptacle defining an opening; and
    a battery integrated with the receptacle, wherein at least some electrical energy stored in the battery is capable of charging an accessory device disposed in the opening.

2. The case as recited in claim 1, wherein the retainer includes a magnet such that the retainer is removably attached to the back cover.

3. The case as recited in claim 1, wherein the retainer is fixedly attached to the back cover.

4. The case as recited in claim 1, wherein the hinge portion defines a recess, and wherein the receptacle extends to the recess.

5. The case as recited in claim 1, further comprising an external power inlet electrically coupled to the battery, the external power inlet is capable of transferring electrical energy from an external power source to the battery.

6. The case as recited in claim 1, wherein the battery is disposable.

7. The case as recited in claim 1, further comprising a slotted compartment carried by the front cover.

8. A case for retaining a portable electronic device, comprising:
a front cover;
a back cover that carries a retainer adapted to retain the portable electronic device;
a hinge portion that pivotally couples the front cover to the back cover, the hinge portion defined by a first recessed area and a second recessed area;
a spine located on the hinge and comprising an opening, the spine extending from the first recessed area to the second recessed area; and
a battery integrated with the spine, wherein at least some electrical energy stored in the battery is capable of charging an accessory device disposed in the opening.

9. The case of claim 8, wherein the spine comprises a tubular spine.

10. The case of claim 8, wherein the opening defines a first opening aligned with the first recessed area, and wherein the spine comprises a second opening aligned with the second recessed area.

11. The case of claim 10, wherein the first opening and the second opening each corresponding to the size of the accessory device and a second accessory device, respectively.

12. The case of claim 8, wherein the battery is configured to charge the accessory device and the portable electronic device when the portable electronic device is located in the retainer.

13. The case of claim 8, wherein the front cover defines a folio cover.

* * * * *